(12) United States Patent
Huang et al.

(10) Patent No.: US 11,728,852 B2
(45) Date of Patent: Aug. 15, 2023

(54) BLOCK MATRIX GENERATION FOR SEQUENCE BASED TRANSMISSIONS

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/242,047

(22) Filed: Apr. 27, 2021

(65) Prior Publication Data

US 2021/0336662 A1    Oct. 28, 2021

Related U.S. Application Data

(60) Provisional application No. 63/016,911, filed on Apr. 28, 2020.

(51) Int. Cl.
| | |
|---|---|
| *H04B 7/0456* | (2017.01) |
| *H04L 27/26* | (2006.01) |
| *H04B 7/06* | (2006.01) |
| *H04L 5/00* | (2006.01) |

(52) U.S. Cl.
CPC ......... *H04B 7/0456* (2013.01); *H04B 7/0639* (2013.01); *H04L 5/0012* (2013.01); *H04L 27/2607* (2013.01)

(58) Field of Classification Search
None
See application file for complete search history.

(56) References Cited

U.S. PATENT DOCUMENTS

| | | | |
|---|---|---|---|
| 2008/0232503 A1 | 9/2008 | Kim | |
| 2013/0223482 A1* | 8/2013 | Pou | H04J 13/0003 375/147 |
| 2019/0207698 A1* | 7/2019 | Zhang | H04J 11/005 |
| 2019/0312623 A1* | 10/2019 | Park | H04B 7/0617 |
| 2021/0242914 A1* | 8/2021 | Park | H04B 7/0478 |

FOREIGN PATENT DOCUMENTS

WO    WO-2016078303 A1 *   5/2016   ............... H04B 7/06

* cited by examiner

*Primary Examiner* — Rebecca E Song
(74) *Attorney, Agent, or Firm* — Holland & Hart LLP

(57) ABSTRACT

Methods, systems, and devices for wireless communications are described. A user equipment (UE) may receive configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload. The UE may generate a plurality of codebooks corresponding to the plurality of first orthogonal matrices. The UE may transmit a first portion the payload using a first sequence from a first codebook of the plurality of codebooks and a second portion of the payload using a second codebook of the plurality of codebooks.

30 Claims, 21 Drawing Sheets

$$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

Column $n$ (indicated); Row $n$ (indicated) — 300

$$S(m) = \begin{bmatrix} S(M-1)\, e^{j2\pi(M-1)m/M} \\ \vdots \\ S(l)\, e^{j2\pi l m/M} \\ \vdots \\ S(2)\, e^{j2\pi 2 m/M} \\ S(1)\, e^{j2\pi 1 m/M} \\ S(0)\, e^{j2\pi 0 m/M} \end{bmatrix}$$

Tone Index ← Tone Index $l$ — 301

FIG. 3A

BLOCK MATRIX GENERATION FOR SEQUENCE BASED TRANSMISSIONS

CROSS REFERENCE

The present application for patent claims the benefit of U.S. Provisional Patent Application No. 63/016,911 by HUANG et al., entitled "BLOCK MATRIX GENERATION FOR SEQUENCE BASED TRANSMISSIONS," filed Apr. 28, 2020, assigned to the assignee hereof, and expressly incorporated by reference herein.

FIELD OF TECHNOLOGY

The following relates generally to wireless communications and more specifically to block matrix generation for sequence based transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may transmit a signal to a base station including a payload. In some cases, the UE may transmit the payload in a resource allocation according to a selected non-orthogonal sequence, which the UE may select out of a set of non-orthogonal sequences. Non-orthogonal sequences may introduce interference or otherwise cause a decrease in reception accuracy or reliability at the base station.

SUMMARY

The described techniques relate to improved methods, systems, devices, and apparatuses that support block matrix generation for sequence based transmissions. Generally, the described techniques provide various techniques to break apart an orthogonal matrix into a plurality of smaller block matrices. For example, a base station may configure a user equipment (UE) with a parameter for generating the plurality of smaller block matrices (e.g., a plurality of first orthogonal matrices) that are based, at least in some aspects, on the original orthogonal matrix (e.g., a second orthogonal matrix). For example, the size of the second orthogonal matrix may be based on the time/frequency resources configured or otherwise available for conveying the payload (e.g., a number of one or more time periods for conveying a payload and the number of one or more frequency tones configured for conveying the payload). The base station and UE may generate the plurality of codebooks corresponding to the plurality of smaller block matrices (e.g., the plurality of first orthogonal matrices). The UE may then transmit or otherwise convey different portions of the payload based on the generated plurality of codebooks. For example, the UE may transmit a first portion of the payload (e.g., a first set of bits) using a first sequence from a first codebook of the plurality of codebooks and a second portion of the payload (e.g., a second set of bits) using a second codebook of the plurality of codebooks. The portions of the payload communicated according to the plurality of codebooks may include the same bits or different bits, may be transmitted using frequency hopping or non-frequency hopping, and the like.

A method of wireless communications at a UE is described. The method may include receiving configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generating a set of codebooks corresponding to the set of first orthogonal matrices, and transmitting a first portion the payload using a first sequence from a first codebook of the set of codebooks and a second portion of the payload using a second codebook of the set of codebooks.

An apparatus for wireless communications at a UE is described. The apparatus may include a processor, memory coupled with the processor, and instructions stored in the memory. The instructions may be executable by the processor to cause the apparatus to receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and transmit a first portion the payload using a first sequence from a first codebook of the set of codebooks and a second portion of the payload using a second codebook of the set of codebooks.

Another apparatus for wireless communications at a UE is described. The apparatus may include means for receiving configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generating a set of codebooks corresponding to the set of first orthogonal matrices, and transmitting a first portion the payload using a first sequence from a first codebook of the set of codebooks and a second portion of the payload using a second codebook of the set of codebooks.

A non-transitory computer-readable medium storing code for wireless communications at a UE is described. The code may include instructions executable by a processor to receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and transmit a first portion the payload using a first sequence from a first codebook of the set of codebooks and a second portion of the payload using a second codebook of the set of codebooks.

In some examples of the method, apparatuses, and non-transitory computer-readable medium described herein, each first orthogonal matrix may be based on a product of a third orthogonal matrix and a cyclically shifted matrix, where a size of the third orthogonal matrix may be based on the parameter and the number of one or more time periods configured for conveying the payload, and where a length of the cyclically shifted matrix may be based on the number of one or more frequency tones configured for conveying the payload.

Some examples of the method, apparatuses, and non-transitory computer-readable medium described herein may further include operations, features, means, or instructions for receiving configuration signaling indicating whether the first portion of the payload and the second portion of the payload may be a same set of bits or different subsets of the payload.

Some examples of the method, apparatuses, and non-transitory computer-readable medium described herein may further include operations, features, means, or instructions for receiving configuration signaling indicating a mapping between the first portion of the payload, the second portion of the payload, and the set of codebooks.

Some examples of the method, apparatuses, and non-transitory computer-readable medium described herein may further include operations, features, means, or instructions for transmitting the first portion of the payload over a first frequency portion associated with a frequency hopping configuration and the second portion of the payload over a second frequency portion associated with the frequency hopping configuration.

In some examples of the method, apparatuses, and non-transitory computer-readable medium described herein, the first portion of the payload and the second portion of the payload include a same set of bits.

In some examples of the method, apparatuses, and non-transitory computer-readable medium described herein, the first portion of the payload include a first subset of bits of the payload and the second portion of the payload include a second subset of bits of the payload.

Some examples of the method, apparatuses, and non-transitory computer-readable medium described herein may further include operations, features, means, or instructions for receiving configuration signaling indicating an ordering of the first subset of bits and the second subset of bits that may be based on the frequency hopping configuration.

In some examples of the method, apparatuses, and non-transitory computer-readable medium described herein, a size of each first orthogonal matrix of the set of orthogonal matrices may be based on a division of the size of the second orthogonal matrix by the parameter.

In some examples of the method, apparatuses, and non-transitory computer-readable medium described herein, each first orthogonal matrix of the set of orthogonal matrices includes a set of orthogonal sequences.

In some examples of the method, apparatuses, and non-transitory computer-readable medium described herein, a value of the parameter may be based on a channel quality metric.

In some examples of the method, apparatuses, and non-transitory computer-readable medium described herein, the second orthogonal matrix includes a set of orthogonal sequences that may be based on a product of a third orthogonal matrix having a size corresponding to the number of one or more time periods and a cyclically shifted cell-specific sequence having a length corresponding to the number of one or more frequency tones.

In some examples of the method, apparatuses, and non-transitory computer-readable medium described herein, the third orthogonal matrix includes a discrete Fourier transform (DFT) matrix.

In some examples of the method, apparatuses, and non-transitory computer-readable medium described herein, the product includes a Kronecker product.

In some examples of the method, apparatuses, and non-transitory computer-readable medium described herein, the payload includes an uplink control information message.

A method of wireless communications at a base station is described. The method may include transmitting configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generating a set of codebooks corresponding to the set of first orthogonal matrices, and receiving a first portion of the payload using a first sequence from a first codebook of the set of codebooks and a second portion of the payload using a second codebook of the set of codebooks.

An apparatus for wireless communications at a base station is described. The apparatus may include a processor, memory coupled with the processor, and instructions stored in the memory. The instructions may be executable by the processor to cause the apparatus to transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and receive a first portion of the payload using a first sequence from a first codebook of the set of codebooks and a second portion of the payload using a second codebook of the set of codebooks.

Another apparatus for wireless communications at a base station is described. The apparatus may include means for transmitting configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generating a set of codebooks corresponding to the set of first orthogonal matrices, and receiving a first portion of the payload using a first sequence from a first codebook of the set of codebooks and a second portion of the payload using a second codebook of the set of codebooks.

A non-transitory computer-readable medium storing code for wireless communications at a base station is described. The code may include instructions executable by a processor to transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and receive a first portion of the payload using a first sequence from a first codebook of the set of codebooks and a second portion of the payload using a second codebook of the set of codebooks.

In some examples of the method, apparatuses, and non-transitory computer-readable medium described herein, each first orthogonal matrix may be based on a product of a third orthogonal matrix and a cyclically shifted matrix, where a size of the third orthogonal matrix may be based on the parameter and the number of one or more time periods configured for conveying the payload, and where a length of the cyclically shifted matrix may be based on the number of one or more frequency tones configured for conveying the payload.

Some examples of the method, apparatuses, and non-transitory computer-readable medium described herein may further include operations, features, means, or instructions for transmitting configuration signaling indicating whether the first portion of the payload and the second portion of the payload may be a same set of bits or different subsets of the payload.

Some examples of the method, apparatuses, and non-transitory computer-readable medium described herein may further include operations, features, means, or instructions for transmitting configuration signaling indicating a mapping between the first portion of the payload, the second portion of the payload, and the set of codebooks.

Some examples of the method, apparatuses, and non-transitory computer-readable medium described herein may further include operations, features, means, or instructions for receiving the first portion of the payload over a first frequency portion associated with a frequency hopping configuration and the second portion of the payload over a second frequency portion associated with the frequency hopping configuration.

In some examples of the method, apparatuses, and non-transitory computer-readable medium described herein, the first portion of the payload and the second portion of the payload include a same set of bits.

In some examples of the method, apparatuses, and non-transitory computer-readable medium described herein, the first portion of the payload include a first subset of bits of the payload and the second portion of the payload include a second subset of bits of the payload.

Some examples of the method, apparatuses, and non-transitory computer-readable medium described herein may further include operations, features, means, or instructions for transmitting configuration signaling indicating an ordering of the first subset of bits and the second subset of bits that may be based on the frequency hopping configuration.

In some examples of the method, apparatuses, and non-transitory computer-readable medium described herein, a size of each first orthogonal matrix of the set of orthogonal matrices may be based on a division of the size of the second orthogonal matrix by the parameter.

In some examples of the method, apparatuses, and non-transitory computer-readable medium described herein, each first orthogonal matrix of the set of orthogonal matrices includes a set of orthogonal sequences.

In some examples of the method, apparatuses, and non-transitory computer-readable medium described herein, a value of the parameter may be based on a channel quality metric.

In some examples of the method, apparatuses, and non-transitory computer-readable medium described herein, the second orthogonal matrix includes a set of orthogonal sequences that may be based on a product of a third orthogonal matrix having a size corresponding to the number of one or more time periods and a cyclically shifted cell-specific sequence having a length corresponding to the number of one or more frequency tones.

In some examples of the method, apparatuses, and non-transitory computer-readable medium described herein, the third orthogonal matrix includes a DFT matrix.

In some examples of the method, apparatuses, and non-transitory computer-readable medium described herein, the product includes a Kronecker product.

In some examples of the method, apparatuses, and non-transitory computer-readable medium described herein, the payload includes an uplink control information message.

BRIEF DESCRIPTION OF THE DRAWINGS

FIGS. 3A and 3B illustrate examples of an orthogonal matrix that supports block matrix generation for sequence based transmissions in accordance with aspects of the present disclosure.

DETAILED DESCRIPTION

Figure 1:
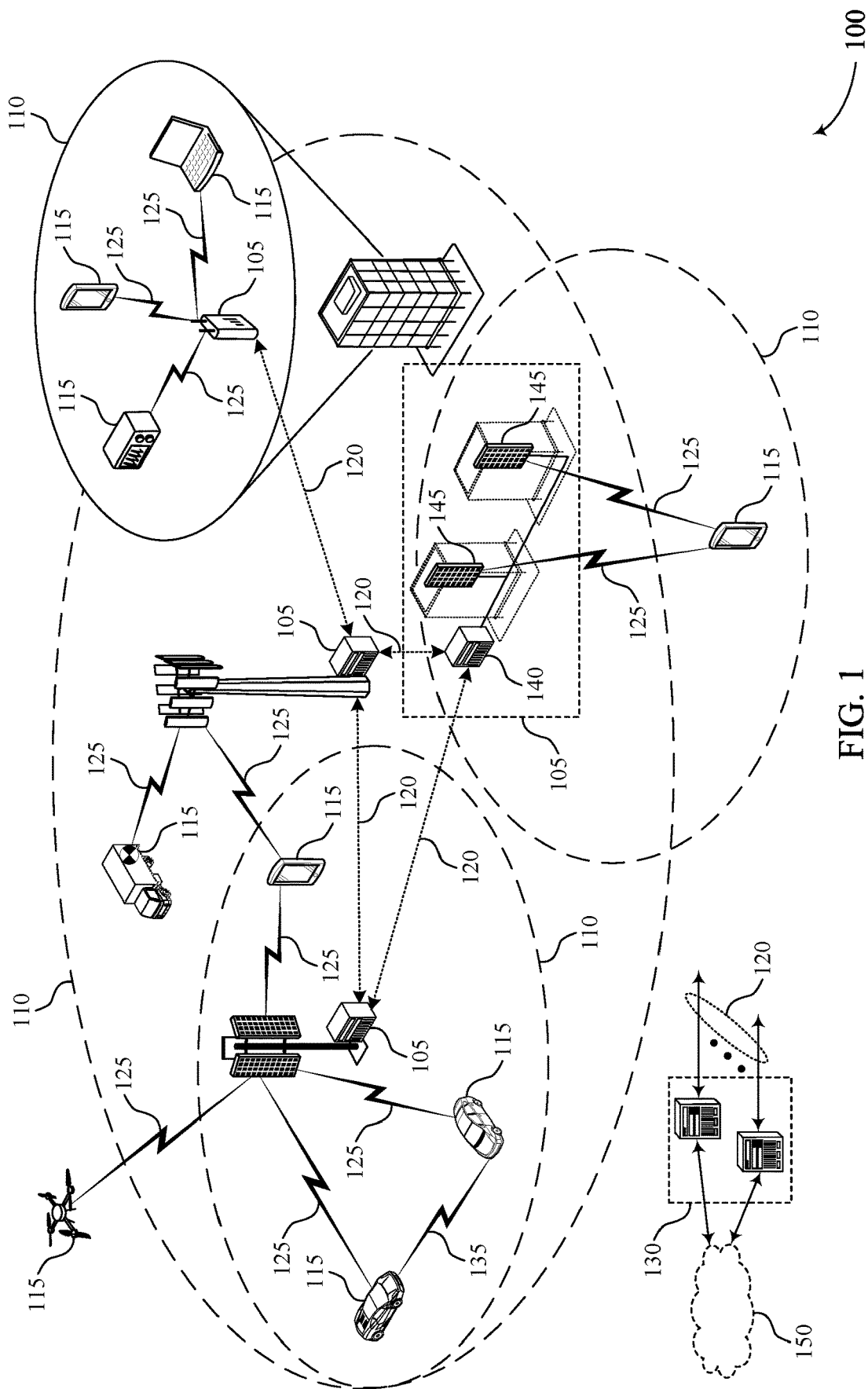
FIG. 1 illustrates an example of a system for wireless communications that supports block matrix generation for sequence based transmissions in accordance with aspects of the present disclosure.

Wireless communications systems may support communications between a user equipment (UE) and a base station. The UE and the base station may communicate over a channel allocated to communication between the UE and the base station. In some cases, the UE and the base station may transmit signals comprising a payload, such as a number of bits of information, to each other over the allocated resources in the channel. For example, the UE may transmit, to the base station, the payload of the signal according to a selected sequence (or codepoint) associated with the allocated resources. In some cases, the UE may use a non-orthogonal sequence to convey the payload. In some systems, however, such as fifth generation (5G) New Radio (NR) systems, the use of non-orthogonal sequences may fail to provide reliable and low-latency communication. For example, the UE, using non-orthogonal sequences for payload transmissions, may fail to meet reliability and low-latency constraints associated with communications over high-frequency radio frequency bands (e.g., frequency range two (FR2) radio frequency bands).

In some examples, the UE or the base station, or both, may generate a set of orthogonal sequences for conveying a payload from the UE to the base station. For example, the UE or the base station, or both, may generate the set of orthogonal sequences based on a product (e.g., a Kronecker product) of an orthogonal matrix and a cell-specific base sequence. In some implementations, the orthogonal matrix may be a square matrix having a size corresponding to a number of orthogonal frequency division multiplexing (OFDM) symbols (e.g., time periods) in a resource allocation over which the UE is configured to transmit the payload. The cell-specific base sequence may be a vector having a size corresponding to a number of one or more frequency tones, or subcarriers, in the resource allocation over which the UE is configured to transmit the payload. The product of the orthogonal matrix and the cell-specific base sequence may generate the set of orthogonal sequences and each orthogonal sequence may have a length corresponding to the number of OFDM symbols multiplied by the number of one or more frequency tones in the resource allocation. In some aspects, the set of orthogonal sequences may be orthogonal in the time-domain and the frequency-domain.

The UE or the base station, or both, may determine a subset of the set of orthogonal sequences, and the UE may store the subset of orthogonal sequences in a constructed codebook. In some implementations, the subset of orthogonal sequences may be based on the number of bits included in the payload, and each orthogonal sequence of the subset of orthogonal sequences may be associated with an index in the constructed codebook. In some examples, the UE may select an orthogonal sequence from the constructed codebook including the subset of orthogonal sequences based on the bits of the payload. For example, the UE may determine a bit stream of the payload and may convert the bit stream into a decimal number. The decimal number may correspond to an index in the constructed codebook and, as such, the UE may select the orthogonal sequence from the constructed codebook that is associated with the index corresponding to the decimal number.

The UE or base station, or both, may break apart an orthogonal matrix into a plurality of smaller block matrices. For example, the base station may configure the UE with a parameter for generating the plurality of smaller block matrices (e.g., a plurality of first orthogonal matrices) that are based, at least in some aspects, on the original orthogonal matrix (e.g., a second orthogonal matrix). For example, the size of the second orthogonal matrix may be based on the time/frequency resources configured or otherwise available for conveying the payload (e.g., a number of one or more time periods for conveying a payload and the number of one or more frequency tones configured for conveying the payload). The base station or UE, or both, may generate the plurality of codebooks corresponding to the plurality of smaller block matrices (e.g., the plurality of first orthogonal matrices). The UE may then transmit or otherwise convey different portions of the payload based on the generated plurality of codebooks. For example, the UE may transmit a first portion of the payload (e.g., a first set of bits) using a first sequence from a first codebook of the plurality of codebooks and a second portion of the payload (e.g., a second set of bits) using a second codebook of the plurality of codebooks. The portions of the payload communicated according to the plurality of codebooks may include the same bits or different bits, may be transmitted using frequency hopping or non-frequency hopping, and the like. Accordingly, the UE may transmit the payload to the base station that includes the plurality of bits using the selected orthogonal sequence.

Particular aspects of the subject matter described herein may be implemented to realize one or more potential advantages. The described techniques may provide for efficient construction of a codebook including a number of orthogonal sequences based on a number of bits of a payload to be transmitted from the UE to the base station. As such, the UE may avoid storing more sequences than necessary to convey the payload. Additionally, the use of orthogonal sequences may provide for lower latency and more reliable communications between the UE and the base station, which may increase the likelihood for successful communications between the UE and the base station. Further, in some implementations of the present disclosure, the UE or the base station, or both, may generate a set of orthogonal sequences based on an orthogonal matrix and a cell-specific base sequence. In some examples, the cell-specific base sequence may be associated with a low peak-to-average power ratio (PAPR) and, based on implementing the described techniques, the UE may transmit the different portions of the payload using an orthogonal sequence such that the low PAPR of the cell-specific base sequence is preserved during transmission of the payload over a number of symbols.

Aspects of the disclosure are initially described in the context of wireless communications systems. Aspects of the disclosure are also described in the context of an orthogonal matrix, a base sequence, a mathematical operation, sets of independent indices, and a set of joint indices. Aspects of the disclosure are further illustrated by and described with reference to apparatus diagrams, system diagrams, and flowcharts that relate to orthogonal sequence generation for multi-bit payloads.

FIG. 1 illustrates an example of a wireless communications system 100 that supports block matrix generation for sequence based transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload. The UE 115 may generate a plurality of codebooks corresponding to the plurality of first orthogonal matrices. The UE 115 may transmit a first portion the payload using a first sequence from a first codebook of the plurality of codebooks and a second portion of the payload using a second codebook of the plurality of codebooks.

A base station 105 may transmit configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload. The base station 105 may generate a plurality of codebooks corresponding to the plurality of first orthogonal matrices. The base station 105 may receive a first portion of the payload using a first sequence from a first codebook of the plurality of codebooks and a second portion of the payload using a second codebook of the plurality of codebooks.

Figure 2:
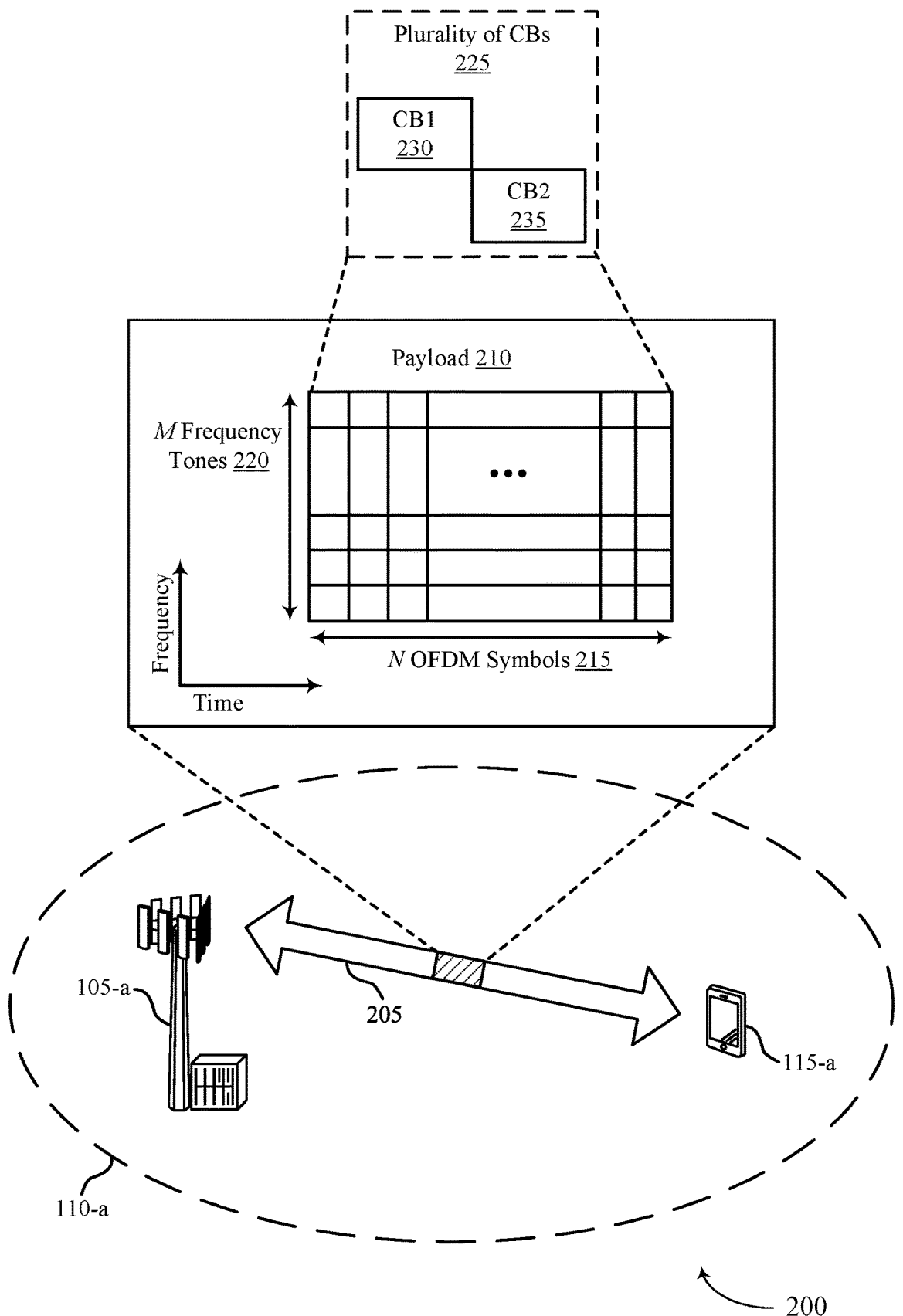
FIG. 2 illustrates an example of a wireless communication system that supports block matrix generation for sequence based transmissions in accordance with aspects of the present disclosure.

FIG. 2 illustrates an example of a wireless communication system 200 that supports block matrix generation for sequence based transmissions in accordance with aspects of the present disclosure. In some examples, wireless communication system 200 may implement aspects of wireless communication system 100. The wireless communication system 200 may include a UE 115-a and a base station 105-a, which may be examples of corresponding devices as described herein. The UE 115-a and the base station 105-a may communicate via a communication link 205 within a geographic coverage area 110-a. In some examples, the UE 115 may transmit a signal including a payload 210 to the base station 105-a via the communication link 205. The payload 210 may occupy a resource allocation of N OFDM symbols 215 and M frequency tones 220 and the UE 115-a may convey the payload 210 using a sequence based on the N OFDM symbols 215 and the M frequency tones 220. In some aspects, UE 115-a may break apart the orthogonal matrix/codebook into smaller orthogonal matrices/codebooks, such as a first codebook 230 and a second codebook 235, for transmitting the payload 210.

As described herein, N may correspond to any number, but may sometimes be defined within the range of 1 to 14. Similarly, M may correspond to any number, but may sometimes be defined within the range of 1 to 12. In some cases, such as when N=14 and M=12, the resource allocation may be a resource block. Further, as described herein, the payload 210 may be an example of any signal including information (e.g., a number of bits) and, although described in the context of transmission from the UE 115-a, may be transmitted by either the UE 115-a or the base station 105-a. In some examples, the payload 210 may be an example of uplink control information and, accordingly, the UE 115-a may transmit the payload 210 in a resource allocation of a physical uplink control channel (PUCCH). In such examples, the N OFDM symbols 215 and the M frequency tones 220 may correspond to a time and frequency resource grid assigned to the PUCCH for the UE 115-a to transmit the payload 210.

In some cases, the wireless communication system 200 may be associated with some latency and reliability conditions or constraints that support communications between the UE 115-a and the base station 105-a. For example, in some cases, the wireless communication system 200 may support communications between the UE 115-a and the base station 105-a based on maintaining low-latency and highly-reliable transmissions between the UE 115-a and the base station 105-a. Such low-latency and high-reliability conditions may be further tightened for communications in high-frequency radio frequency bands, such as communications in a frequency range two (FR2) radio frequency band (e.g., a millimeter wave (mmW) radio frequency band). In some cases, the UE 115-a may use a non-orthogonal sequence (or codepoint) to convey the payload 210. For example, the UE 115-a may generate or be configured with a codebook of non-orthogonal sequences and the UE 115-a may select a non-orthogonal sequence from the codebook to convey the payload 210. In some circumstances, however, such use of non-orthogonal sequences may fail to meet the latency or reliability constraints of the wireless communications system 200, which may decrease the likelihood for successful communications between the UE 115-a and the base station 105-a.

In some implementations of the present disclosure, the UE 115-a or the base station 105-a, or both, may identify a set of orthogonal sequences from which the UE 115-a may select a sequence for conveying the payload 210. In some cases, such use of orthogonal sequences to convey the payload 210 may provide for low-latency and reliable communications with the base station 105-a. Accordingly, the wireless communication system 200, based on supporting orthogonal sequences for conveying a payload 210, may increase the likelihood for successful communications between the UE 115-a and the base station 105-a.

In some examples, the UE 115-a or the base station 105-a, or both, may generate a number of orthogonal sequences based on the resources allocated for the payload 210. For example, the UE 115-a and the base station 105-a may communicate via a resource allocation of a communication channel and the UE 115-a or the base station 105-a, or both, may generate a number of orthogonal sequences based on the resource allocation. For instance, the base station 105-a may allocate N OFDM symbols 215 and M frequency tones 220 for transmission of the payload 210 and, accordingly, the UE 115-a or the base station 105-a, or both, may generate a number of orthogonal sequences equal to N*M. In some aspects, each orthogonal sequence of the set of orthogonal sequences may have a length equal to the size of the resource allocation (e.g., the number of resource elements in the resource allocation, or N*M), such that each orthogonal sequence may convey the payload 210 across the resource allocation. As such, the UE 115-a or the base station 105-a, or both, may generate a set of N*M orthogonal sequences and each orthogonal sequence may be associated with a length of N*M. The generation of the set of orthogonal sequences is described in more detail with reference to FIGS. 3A and 3B.

The UE 115-a or the base station 105-a, or both, may determine a subset of the set of orthogonal sequences based on the payload 210. For example, the UE 115-a or the base station 105-a, or both, may determine a size of the payload 210 (e.g., a number of bits included in the payload 210) and may determine a subset of the set of orthogonal sequences based on the size of the payload 210. For instance, the payload 210 may include a number of bits equal to K and, accordingly, the number of orthogonal sequences within the determined subset of orthogonal sequences may be based on the value of K. In some implementations, for example, the UE 115-a or the base station 105-a, or both, may select a number of orthogonal sequences equal to $2^K$ based on identifying that the payload 210 includes K bits. In some cases, the UE 115-a or the base station 105-a, or both, may select $2^K$ orthogonal sequences because $2^K$ orthogonal sequences may provide one orthogonal sequence for each possible value (i.e., permutation) of K bits.

As such, the UE 115-a or the base station 105-a, or both, may identify a subset of orthogonal sequences (e.g., a subset of $2^K$ orthogonal sequences) from which the UE 115-a may select an orthogonal sequence to convey the payload 210. In the case that the base station 105-a generates the set of orthogonal sequences and determines the subset of orthogonal sequences, the base station 105-a may signal an indication of the subset of orthogonal sequences to the UE 115-a and the UE 115-a may construct a codebook including the indicated subset of orthogonal sequences. Alternatively, in the case that the UE 115-a, or both the UE 115-a and the base station 105-a, generates the set of orthogonal sequences and selects the subset of orthogonal sequences from the set of orthogonal sequences, the UE 115-a may construct a codebook including the subset of orthogonal sequences without additional signaling from the base station 105-a. In some aspects, the UE 115-a may construct the codebook such that each orthogonal sequence of the subset of orthogonal sequences in the codebook is associated with an index in the codebook.

The UE 115-a may select an orthogonal sequence from the subset of orthogonal sequences (e.g., from the constructed codebook) to convey the payload 210 based on the bits in the payload 210. For example, the UE 115-a may identify a bit stream (e.g., successive values of a number of bits) of the payload 210 and may select an orthogonal sequence from the codebook based on the bit stream. The bit stream may be represented as $b_0, b_1, b_2, \ldots b_{K-1}$, where b corresponds to a value of a bit and K is equal to the number of bits in the payload 210. In some implementations, the UE 115-a may convert the bit stream to a number (e.g., a decimal number), such as k, that may correspond to an orthogonal sequence of the subset of orthogonal sequences. For example, k may correspond to or map to an index in the codebook of the subset of orthogonal sequences. As such, the UE 115-a may convert the bit stream of the payload 210 into the value k and may determine which orthogonal sequence of the subset of orthogonal sequences corresponds to the index value of k (e.g., the UE 115-a may determine the $k^{th}$ sequence in the constructed codebook). Accordingly, the UE 115-a may select the orthogonal sequence corresponding to the index value of k and may transmit the payload 210 using the selected orthogonal sequence.

The UE 115-a, implementing the described techniques, may efficiently construct a codebook of orthogonal sequences and select one of the orthogonal sequences to convey the payload 210 based on the number of bits in the payload 210, which may increase the likelihood that the base station 105-a is able to successfully receive the payload 210 while avoiding unnecessary storage costs associated with storing the full set of generated orthogonal sequences. Moreover, the described techniques may support and maintain a low PAPR associated with the transmission of the payload 210, which may enable to the UE 115-a to more use a greater transmit power when transmitting the payload 210.

Although the described techniques may be beneficial in many ways, in some aspects these techniques may limit the number of bits that can be conveyed in payload 210. That is, using an N*M orthogonal matrix, at most a size N*M codebook can be constructed. That is, at most $\log_2$ N*M bits can be transmitted in N*M resource elements. For example, within a resource block, at most log(14*12)=7 bits can be transmitted if the bits are assigned jointly to discrete Fourier transform (DFT) and the cyclically shifted version of cell-specific sequences (CS) domain. If the bits are assigned separately to the DFT and CS domain, at most floor $\log_2$(14)+floor $\log_2$(12)=3+3=6 bits can be transmitted in one resource block. However, aspects of the described techniques enable transmission of more bits in payload 210 for orthogonal sequence based PUCCH by breaking apart the orthogonal matrix/codebook discussed above into smaller orthogonal matrices/codebooks, with each block transmitting a subset of the UCI payload.

For example, aspects of the described techniques break the N*M matrix (e.g., a second orthogonal matrix) into L smaller block matrices (e.g., a plurality of first orthogonal matrices) where each block is orthogonal and the size of each block is (N*M)/L. One block (e.g., each codebook) can transmit $$\text{floor } \log_2\left(\frac{N*M}{L}\right) = floow \log_2(N*M) - \log_2 L \text{ bits.}$$

blocks can transmit in total L*floor $\log_2$(N*M)–$\log_2$ L. As one non-limiting example, one resource block can transmit up to 6 bits based on size-14 DFT (3 bits) and 12 CS (3 bits). When using 2*size-7 DFT and 12 CS, 2*2+3=7 bits can be transmitted, with some performance loss. When using 14*size-1 DFT, 14*3=42 bits can be transmitted, with a performance degradation from a 14 symbol long PUCCH to a one symbol short PUCCH. The network (e.g., via base station 105-a) may choose, signal, or otherwise configure the parameter L as a trade-off between the UCI data rate and reliability, e.g., based on a SNR, congestion levels, throughput requirements, reliability requirements, and the like.

Accordingly, base station 105-a may transmit configuration signaling to UE 115-a indicating a parameter (e.g., L and/or other parameters) for generating a plurality of first orthogonal matrices (e.g., such as the first codebook 230 and the second codebook 235 of the plurality of codebooks 225). The first orthogonal matrices may be based on DFT=(N/L)*CS (M). The plurality of first orthogonal matrices may be based on a second orthogonal matrix (e.g., as discussed above and based on DFT(N)*CS(M)) where a size of the second orthogonal matrix is based on the number of N OFDM symbols 215 and M frequency tones 220 configured for conveying payload 210. UE 115-a or base station 105-a, or both, may generate a plurality of codebooks corresponding to the plurality of first orthogonal matrixes. UE 115-a and transmit (and base station 105-a may receive) a first portion of payload 210 using a first sequence from the first codebook 230 of the plurality of codebooks 225 and a second portion of the payload 210 using the second codebook 235 of the plurality of codebooks 225. Base station 105-a may also transmit configuration signaling to UE 115-a indicating whether the first portion of the payload 210 (e.g., based on the first codebook 230) and the second portion of the payload 210 (e.g., based on the second codebook 235) include the same set of bits or different subsets of the payload 210, e.g., whether the payload 210 is transmitted multiple times or is divided amongst different transmissions.

In some aspects, each first orthogonal matrix may be based on a product of a third orthogonal matrix (e.g., based on DFT(N/L)) and a cyclically shifted matrix. The size of the third orthogonal matrix may be based on the parameter and the number of N OFDM symbols 215 configured to convey payload 210. The length of the cyclically shifted matrix may be based on the number of M frequency tones 220 configured to convey payload 210.

Base station 105-a may also transmit configuration signaling to UE 115-a indicating a mapping between the first portion of the payload, the second portion of the payload, and the plurality of codebooks. For example, relevant standards may provide a mapping to be followed, with base station 105-a providing an index or other indicator to a particular mapping. For example, the mapping may correspond to the first portion of the payload being mapped to the first codebook 230, the second portion of the payload being mapped to the second codebook 235, and so forth. In some aspects, the ordering for the portions being mapped may be based from most significant bit (MSB) to least significant bit (LSB), or vice versa.

FIG. 3 illustrate examples of a orthogonal matrix 300 and a base sequence 301 that supports block matrix generation for sequence based transmissions in accordance with aspects of the present disclosure. In some examples, orthogonal matrix 300 and the base sequence 301 may be implemented to realize aspects of wireless communication system 100 and wireless communication system 200. For example, a UE 115 or a base station 105, or both, may use the orthogonal matrix 300 and the base sequence 301 to generate a set of orthogonal sequences from which the UE 115-a may select an orthogonal sequence to convey a payload to the base station 105. The UE 115 and the base station 105 may be examples of corresponding devices as described herein.

The orthogonal matrix 300, which may be referred to as W, may be an orthogonal, square matrix of size N (i.e., an N×N matrix). In some implementations, N may be equal to the number of symbols of a resource allocation associated with transmission of the payload, as described in more detail with reference to FIG. 2. Further, in some specific examples, the orthogonal matrix 300 may be a DFT matrix and, as such, may be equivalently referred to as a DFT matrix. Accordingly, a row or a column of the orthogonal matrix 300 (e.g., a vector) may be referred to as either $\vec{w}(n)$ or $\vec{DFT}(n)$, where n is an index of the row or the column of the orthogonal matrix 300 (e.g., the $n^{th}$ row or column). Although FIG. 3A illustrates n=1, n may be equal to any number n=0, 1, 2, . . . , N−1. A row of the orthogonal matrix 300 is defined by Equation 1, shown below.

$$\vec{DFT}_{(n)} = [\omega^{0n}, \omega^{1n}, \omega^{2n}, \ldots, \omega^{in}, \ldots, \omega^{(N-1)n}] \quad (1)$$

The corresponding column of the orthogonal matrix 300 may be equal to $\vec{DFT}(n)^T$. In Equation 1, ω may be defined as either $\omega = e^{-j2\pi/N}$ or $\omega = e^{j2\pi/N}$. Each column of the vector $\vec{DFT}(n)$ (or each row of the vector $\vec{DFT}(n)^T$) may correspond to an OFDM symbol index i, where i=0 in the first column (i.e., the left-most column) of the orthogonal matrix 300 and increments by one to i=N−1 in the last column (i.e., the right-most column) of the orthogonal matrix 300. In some cases, an OFDM symbol index i may correspond to an OFDM symbol of the resource allocation that the UE 115 may use to transmit the payload. In some cases, the phase ramp of a row or a column of the orthogonal matrix 300 may be defined as i*n, where i is the OFDM symbol index and n may describe the slope of the phase change. As such, a column or a row of the orthogonal matrix 300 may include entries for each OFDM symbol of the resource allocation in one frequency tone.

The base sequence 301, which may be equivalently referred to as a base sequence $\vec{S}(m)$, may be a cyclically shifted frequency-domain base sequence. In other words, the base sequence 301 may be a frequency-domain base sequence S associated with a cyclic shift in the time-domain. As such, the base sequence S may be based on a cyclic shift index m, where m=0, 1, 2, . . . , M−1. In some aspects, M may be equal to the number of one or more frequency tones of a resource allocation associated with the transmission of the payload, as described in more detail with reference to FIG. 2. Equivalently, the base sequence S may be associated with a phase ramp vector in the frequency domain, such as $e^{-j2\pi lm/M}$ or $e^{j2\pi lm/M}$, and the phase ramp vector and the base sequence S may be multiplied together to determine the base sequence $\vec{s}(m)$, as shown by base sequence 301.

For example, the UE 115 or the base station 105, or both, may take a DFT or a fast Fourier transform (FFT) of the base sequence S in the frequency-domain to convert the base sequence S to the time-domain, where the time-domain representation of the base sequence S, which may be referred to as S̃, has a length M. The UE 115 or the base station 105, or both, may apply a cyclic shift index m to S̃ to shift S̃ by index m, which may effectively move the entries of $\vec{S}$ forward or backward by m in a cyclic fashion. The time-domain cyclic shift may correspond to the frequency-domain phase ramp vector $e^{-j2\pi lm/M}$ or $e^{j2\pi lm/M}$. The index m of the phase ramp may correspond to a slope of the phase ramp (e.g., the phase ramp may be defined as m/M) and the index l may correspond to a tone index of the resource allocation. As shown in base sequence 301, S(0), S(1), S(2), . . . , S(l), . . . , S(M−1) may correspond to entries of the base sequence S for each frequency tone l=0, 1, 2, . . . , M−1. Accordingly, the base sequence 301 may include entries for each frequency tone of the resource allocation in one OFDM symbol.

In some cases, the base sequence 301 may be a cell-specific base sequence, such that each UE 115 within a cell of the base station 105 (e.g., within a geographic coverage area of the base station 105) may use the same base sequence 301. Further, in some cases, the base sequence 301 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 301.

As illustrated in FIG. 3A, the base sequence 301 may be a vector of size M×1. Additionally, there may be a number of base sequences 301 equal to the number of cyclic shift indices associated with the base sequence 301. For instance, there may be M base sequences 301 (i.e., one base sequence $\vec{s}(m)$ for each of m=0, 1, 2, . . . , M−1). Further, each row of the base sequence 301 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a number of base sequences 301 (e.g., a number equal to M) may be considered, and the number of base sequences 301 may be visualized as a matrix of base sequences $\vec{s}(m)$ of dimensions M×M (e.g., M cyclic shifts×M frequency tones).

As described herein, the UE 115 or the base station 105, or both, may generate a set of orthogonal sequences. In some examples, the UE 115 or the base station 105, or both, may generate a number of orthogonal sequences based on a product, such as a Kronecker product, of the orthogonal matrix 300 and each of the number of base sequences 301. The Kronecker product of the orthogonal matrix 300 and each of the number of base sequences 301 may involve determining the Kronecker product of each row or column n of the orthogonal matrix 300 and each cyclic shift index m of the base sequence 301, and repeating the operation for all permutations of n and m, where n=0, 1, . . . , N−1 and m=0, 1, . . . , M−1.

As such, the number of orthogonal sequences in the set may be equal to the product of the dimensions of the orthogonal matrix 300 and a matrix representation of the base sequences 301. For instance, the orthogonal matrix 300 may be a matrix of size N×N and the base sequences 301 may be represented by a matrix of size M×M and, therefore, the Kronecker product between the two may result in an (N*M)×(N*M) matrix (e.g., an orthogonal (N*M)×(N*M) matrix). In other words, the UE 115 or the base station 105, or both, may generate a number of orthogonal sequences equal to N*M and each orthogonal sequence may have a length of N*M. As such, each orthogonal sequence may have a length equal to the number of resource elements (e.g., the number of OFDM symbol×frequency tone resource elements) included in the resource grid that is allocated to the UE 115 for transmission of the payload. Further, based on using a Kronecker product of the orthogonal matrix 300 and the base sequence 301, the signal transmitted on each OFDM symbol may have the same PAPR as the base sequence 301, which may improve the coverage area of the UE 115 because the UE 115 may drive a power amplifier to a set power ratio and use a maximum transmit power of the UE 115 to transmit the signal. The generation of an individual orthogonal sequence using a Kronecker product is described in more detail with reference to FIG. 3B.

Figure 3B:
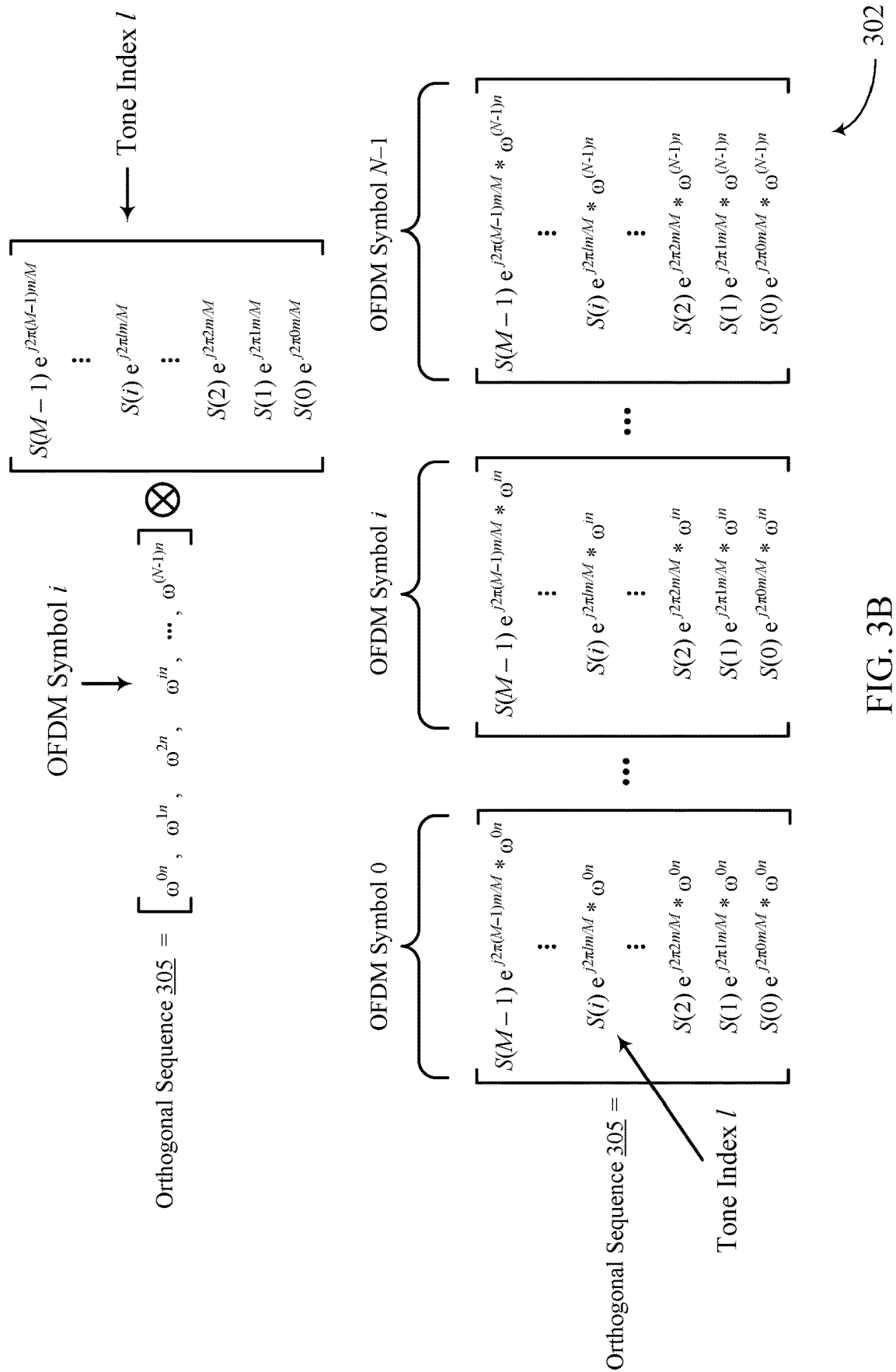

FIG. 3B illustrates an example of a mathematical operation 302 that supports orthogonal sequence generation for multi-bit payloads in accordance with aspects of the present disclosure. The mathematical operation 302 may be an example of a Kronecker product of a row or a column (e.g., a vector) of the orthogonal matrix 300 and a base sequence 301. In some examples, a UE 115 or a base station 105, or both, which may be examples of corresponding devices as described herein, may perform the mathematical operation 302 to determine an orthogonal sequence 305 (e.g., a sequence that is orthogonal in time and frequency). The UE 115 or the base station 105, or both, may determine the orthogonal sequence 305 when generating the set of orthogonal sequences (e.g., the N*M orthogonal sequences), as described in more detail with reference to FIG. 3A. For example, the mathematical operation 302 may illustrate a step or an operation of the generation of the set of orthogonal sequences and, as such, the mathematical operation 302 may be similarly performed for each unique pair of row or column index n of the orthogonal matrix 300 and cyclic shift index m of the base sequence 301. For instance, the UE 115 or the base station 105, or both, may perform the mathematical operation 302 N*M times (e.g., to generate N*M orthogonal sequences 305).

The UE 115 or the base station 105, or both, may determine a row or a column index n of the orthogonal matrix 300 from the N−1 row and column indices of the orthogonal matrix 300 and a cyclic shift index m of the base sequence 301 from the M−1 cyclic shift indices of the base sequence 301. In other words, the UE 115 or the base station 105, or both, may determine the vector corresponding to the row or the column index n of the orthogonal matrix 300, which may be referred to as $\overrightarrow{DFT}(n)$ and be defined by Equation 1, and the vector corresponding to the cyclic shift index m of base sequence 301, which may be illustrated by base sequence $\vec{s}(m)$ (e.g., base sequence 301 may illustrate $\vec{s}$ (cyclic index=m)).

The UE 115 or the base station 105, or both, may determine the Kronecker product of $\overrightarrow{DFT}(n)$ and $\vec{s}(m)$ to determine the orthogonal sequence 305. The Kronecker product is defined such that the base sequence $\vec{s}(m)$ is multiplied by each column of $\overrightarrow{DFT}(n)$ if $\overrightarrow{DFT}(n)$ is a row vector or by each row of $\overrightarrow{DFT}(n)$ if $\overrightarrow{DFT}(n)$ is a column vector. For instance, the Kronecker product of $\overrightarrow{DFT}(n)$ and $\vec{s}(m)$ may be defined by Equation 2, shown below and in expanded form in FIG. 3B.

$$\overrightarrow{DFT}(n) \oplus \vec{s}(m) = [\omega^{0n} * \vec{s}(m), \omega^{1n} * \vec{s}(m), \omega^{2n} * \vec{s}(m), \ldots \omega^{in} * \vec{s}(m), \omega^{(N-1)n} * \vec{s}(m)] \quad (2)$$

In some implementations, such as when $\overrightarrow{DFT}(n)$ and $\vec{s}(m)$ are either both row vectors or both column vectors, Equation 2 may generate a 1×(N*M) orthogonal sequence 305 (in the case that $\overrightarrow{DFT}(n)$ and $\vec{s}(m)$ are column vectors) or an (N*M)×1 orthogonal sequence 305 (in the case that $\overrightarrow{DFT}(n)$ and $\vec{s}(m)$ are row vectors). Alternatively, in some other implementations, $\overrightarrow{DFT}(n)$ may be a row vector and $\vec{s}(m)$ may be a column vector. In such implementations, Equation 2 may generate an orthogonal sequence of dimensions N×M. In such implementations, the UE 115 or the base station 105, or both, may concatenate each column below the lowest entry of the previous column to effectively generate a (N*M)×1 orthogonal sequence 305. The UE 115 or the base 105, or both, may perform such concatenation so that the orthogonal sequence 305 is represented as a column (or a row) and may be indexed in a codebook. In either implementation, each entry in the orthogonal sequence 305 may be associated with a unique (i,l) pair, where i may correspond to an OFDM symbol index of the N OFDM symbols of the resource allocation and l may correspond to a frequency tone index of the M frequency tones in the resource allocation. Accordingly, regardless of the specific implementation, the UE 115 or the base station 105 may map the generated orthogonal sequence 305 to the allocated resource grid such that an entry of the orthogonal sequence 305 corresponding to a unique (i,l) pair maps to a resource element of the resource grid associated with the (i,l) pair (e.g., the resource element at the $i^{th}$ OFDM symbol and the $l^{th}$ frequency tone of the resource grid).

In some examples, an OFDM symbol index i=0 may correspond to the first OFDM symbol (e.g., the temporally earliest) of the resource allocation and a frequency tone index i=0 may correspond to the lowest frequency tone (e.g., the lowest frequency subcarrier) of the resource allocation. Likewise, an OFDM symbol index i=N−1 may correspond to the last (e.g., the temporally latest) OFDM symbol of the resource allocation and a frequency tone index i=M−1 may correspond to the highest frequency tone (e.g., the highest frequency subcarrier) of the resource allocation.

Such generation of a set of orthogonal sequences 305 may be correspond a spreading of the base sequence 301 in the time-domain (e.g., based on a CDMA concept) via the orthogonal matrix 300 (e.g., using a DFT vector in the time-domain) and a phase ramping in the frequency-domain based on the cyclic shift index of the base sequence 301. As described with reference to FIG. 2, the phase ramping in the frequency-domain may correspond to (e.g., be equivalent to) a cyclic shift in the time-domain. In the case that the orthogonal matrix is a DFT matrix, the described techniques may also correspond to a DFT-based orthogonal cover code and cyclic shift-based multiplexing representation of the payload for a single user. Further, the implementations of the present disclosure may correspond to an index modulation scheme using N DFT dimensions and M cyclic shift dimensions to carry a number of bits based on the N and M dimensions. For instance, such an index modulation scheme may carry the payload based on an on-off pattern on the N*M tones of the orthogonal sequence 305. When using index modulation, the UE 115 may convey different information by using different on-off patterns on the N*M tones of the orthogonal sequence 305. In some examples, the described techniques may be implemented to carry $\log_2(N*M)$ bits based on having N DFT dimensions and M cyclic shift dimensions (e.g., an orthogonal sequence 305 of length N*M generated by the orthogonal matrix 300 and the base sequence 301 may carry $\log_2(N*M)$ bits).

As such, the UE 115 or the base station 105, or both, may determine the orthogonal sequence 305 that may convey a payload across the resources allocated for the transmission of the payload. The UE 115 or the base station 105, or both may repeat the mathematical operation 302 for each unique pair of row or column index n of the orthogonal matrix 300 and each cyclic shift index m of the base sequence 301 (i.e., each unique (n, m) pair) to generate N*M orthogonal sequences 305, where each of the N*M orthogonal sequences 305 may convey the payload across each resource element in the resource grid defined by N OFDM symbols and M frequency tones. In some implementations, the UE 115 or the base station 105, or both, may construct a codebook of a subset of the N*M orthogonal sequences 305 based on the number of bits in the payload.

In some aspects, the orthogonal matrix 300 may be an example of a second orthogonal matrix is used as a basis, along with the parameter configured by the base station, for generating a plurality of first orthogonal matrices, as is described in further detail with reference to FIGS. 4 through 6.

Figure 4:
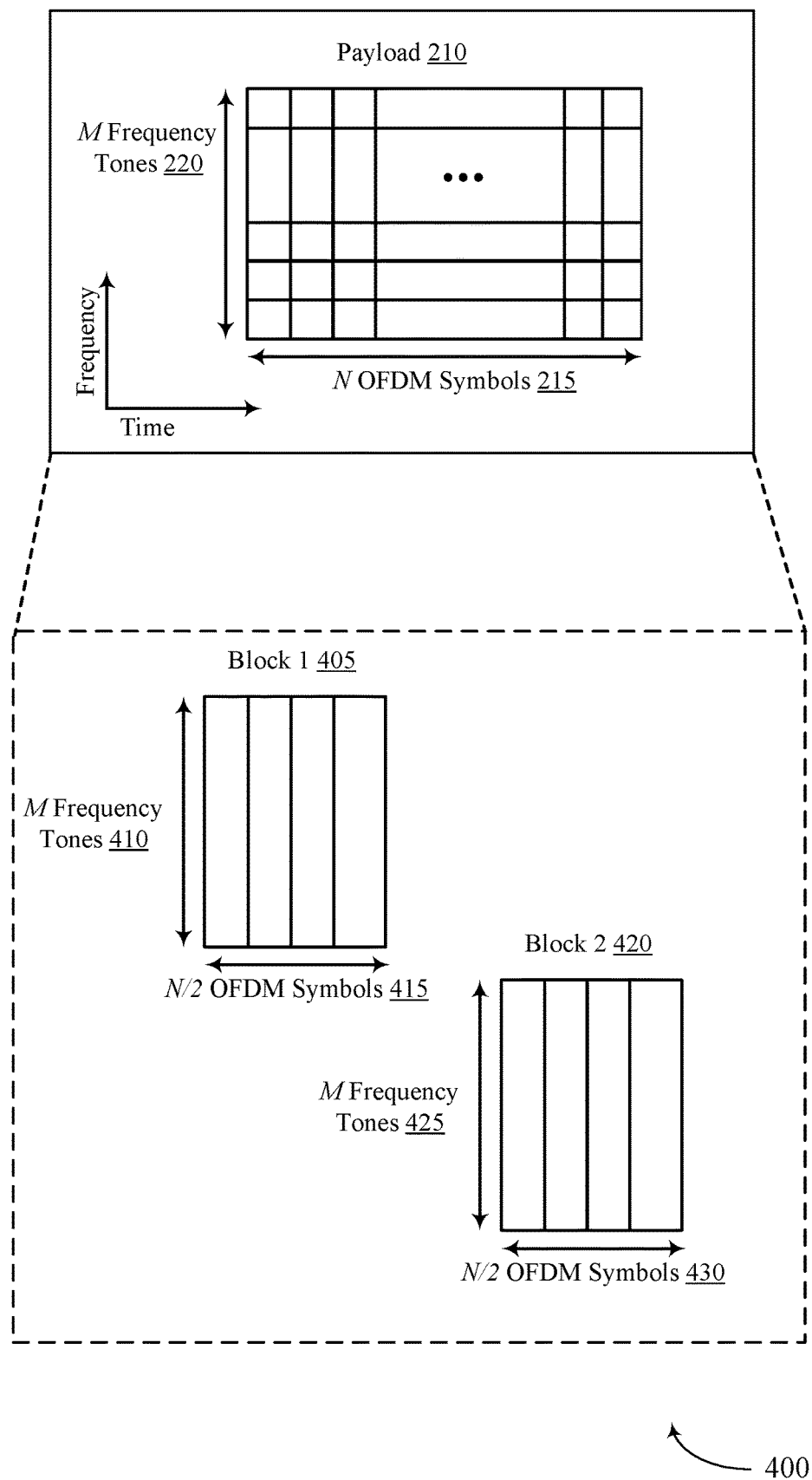
FIG. 4 illustrates an example of a matrix configuration that supports block matrix generation for sequence based transmissions in accordance with aspects of the present disclosure.

FIG. 4 illustrates an example of a matrix configuration 400 that supports block matrix generation for sequence based transmissions in accordance with aspects of the present disclosure. In some examples, matrix configuration 400 may be implemented to realize aspects of wireless communication system 100 and wireless communication system 200 as well as orthogonal matrix 300. For example, a UE or a base station, or both, may use the matrix configuration 400 to generate a set of orthogonal sequences from which the UE may select an orthogonal sequence to convey a payload to the base station. The UE and the base station may be examples of corresponding devices as described herein.

As discussed above with respect to FIG. 2, the UE may transmit a signal including a payload 210 to the base station via a communication link. The payload 210 may occupy a resource allocation of N OFDM symbols 215 and M frequency tones 220 and the UE may convey the payload 210 using a sequence based on the N OFDM symbols 215 and the M frequency tones 220. In some aspects, the UE may break apart the orthogonal matrix/codebook into smaller orthogonal matrices/codebooks, such as a first codebook 405 (e.g., a first block) and a second codebook 420 (e.g., a second block), of a plurality of first orthogonal matrices, for transmitting the payload 210.

In some examples, the payload 210 may be an example of uplink control information (e.g., UCI payload) and, accordingly, the UE may transmit the payload 210 in a resource allocation of a PUCCH. In such examples, the N OFDM symbols 215 and the M frequency tones 220 may correspond to a time and frequency resource grid assigned to the PUCCH for the UE to transmit the payload 210. The size of the second orthogonal matrix may be based on a product of a third orthogonal matrix having a size corresponding to the number of one or more time periods (e.g., N OFDM symbols 215) and a cyclically shifted cell-specific sequence having a length corresponding to the number of one or more frequency tones (e.g., M frequency tones 220). The third orthogonal matrix may be an example of a DFT matrix and the product may be a Kronecker product.

Although the techniques described with reference to FIG. 2 may be beneficial in many ways, in some aspects these techniques may limit the number of bits that can be conveyed in payload 210. That is, using an N*M orthogonal matrix, at most a size N*M codebook can be constructed. That is, at most $\log_2$ N*M bits can be transmitted in N*M resource elements. For example, within a resource block, at most log(14*12)=7 bits can be transmitted if the bits are assigned jointly to the DFT domain and the CS domain. If the bits are assigned separately to the DFT and CS domains, at most floor $\log_2(14)$+floor $\log_2(12)$=3+3=6 bits can be transmitted in one resource block. However, aspects of the described techniques enable transmission of more bits in payload 210 for orthogonal sequence based PUCCH by breaking apart the orthogonal matrix/codebook discussed above into smaller orthogonal matrices/codebooks, with each block transmitting a subset of the UCI payload.

For example, aspects of the described techniques break the N*M matrix (e.g., a second orthogonal matrix) into L smaller block matrices (e.g., a plurality of first orthogonal matrices) where each block is orthogonal and the size of each block is (N*M)/L. Each of the first codebook 405 and the second codebook 420 may include a plurality of orthogonal sequences. One block (e.g., each codebook) can transmit $$\text{floor } \log_2\left(\frac{N*M}{L}\right) = \text{floor } \log_2(N*M) - \log_2 L \text{ bits.}$$

L blocks can transmit in total L*floor $\log_2$(N*M)–$\log_2$ L. As one non-limiting example, one resource block can transmit up to 6 bits based on size-14 DFT (3 bits) and 12 CS (3 bits). When using 2*size-7 DFT and 12 CS, 2*2+3=7 bits can be transmitted, with some performance loss. When using 14*size-1 DFT, 14*3=42 bits can be transmitted, with a performance degradation from a 14 symbol long PUCCH to a one symbol short PUCCH. The network (e.g., via the base station) may choose, signal, or otherwise configure the parameter L as a trade-off between the UCI data rate and reliability, e.g., based on a SNR, congestion levels, throughput requirements, reliability requirements, and the like. That is, the value of the parameter L can be based on the channel quality metric in order to select the best tradeoff based on current conditions.

Accordingly, the base station may transmit configuration signaling to the UE indicating a parameter (e.g., L and/or other parameters) for generating a plurality of first orthogonal matrices (e.g., such as the first codebook 405 and the second codebook 420 of the plurality of codebooks). The first orthogonal matrices may be based on DFT=(N/L)*CS (M). The first codebook 405 may span M frequency tones 410 in the frequency domain (e.g., the DFT domain) and N/2 OFDM symbols 415 in the time domain (e.g., the CS domain). Similarly, the second codebook 420 may span M frequency tones 425 in the frequency domain (e.g., the DFT domain) and N/2 OFDM symbols 430 in the time domain (e.g., the CS domain). The M frequency tones 410 of the first codebook 405 may include or span the same or a different number of tones as the M frequency tones 425 of the second codebook 420. Although illustrated as using different CS domain symbols, it is to be understood that the N/2 OFDM symbols 415 of the first codebook 405 may include or span the same or a different number of symbols as the N/2 frequency tones 425 of the second codebook 420. That is, the size of each orthogonal matrix is the plurality of orthogonal matrices may be based on a division of the size of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols 215 and M frequency tones 220 configured for conveying payload 210. The UE or base station, or both, may generate a plurality of codebooks corresponding to the plurality of first orthogonal matrices, such as the first codebook 405 and the second codebook 420. The UE may transmit (and base station may receive) a first portion of payload 210 using a first sequence from the first codebook 405 of the plurality of codebooks and a second portion of payload 210 using the second codebook 420 of the plurality of codebooks. That is, the UE may select a first sequence from the first codebook 405 to use for transmission of the first portion of the payload 210 and select a second sequence from the second codebook 420 to use for transmission of the second portion of the payload 210.

The base station may also transmit configuration signaling to the UE indicating whether the first portion of the payload 210 (e.g., based on the first codebook 405) and the second portion of the payload 210 (e.g., based on the second codebook 420) include the same set of bits or different subsets of the payload 210, e.g., whether the payload 210 is transmitted multiple times or is divided amongst different transmissions.

In some aspects, each first orthogonal matrix may be based on a product of a third orthogonal matrix (e.g., based on DFT(N/L)) and a cyclically shifted matrix (e.g., a base sequence associated with a plurality of cyclic shifts, such as a CS matrix). The size of the third orthogonal matrix may be based on the parameter and the number of N OFDM symbols 215 configured to convey payload 210. The length of the cyclically shifted matrix may be based on the number of M frequency tones 220 configured to convey payload 210.

The base station may also transmit configuration signaling to the UE indicating a mapping between the first portion of the payload, the second portion of the payload, and the plurality of codebooks. For example, relevant standards may provide a mapping to be followed, with the base station providing an index or other indicator to a particular mapping. For example, the mapping may correspond to the first portion of the payload being mapped to the first codebook 405, the second portion of the payload being mapped to the second codebook 420, and so forth. In some aspects, the ordering for the portions being mapped may be based from MSB to LSB, or vice versa. In other examples, the base station may explicitly transmit the mapping indication to the UE.

Accordingly, the UE may transmit the first and second portions based on sequences from the first and second codebooks 405 and 420, respectively, to the base station. The base station may receive each portion of the payload 210 (e.g., multiple subsets of bits) according to the plurality of codebooks corresponding to the plurality of first orthogonal matrices.

Figure 5:
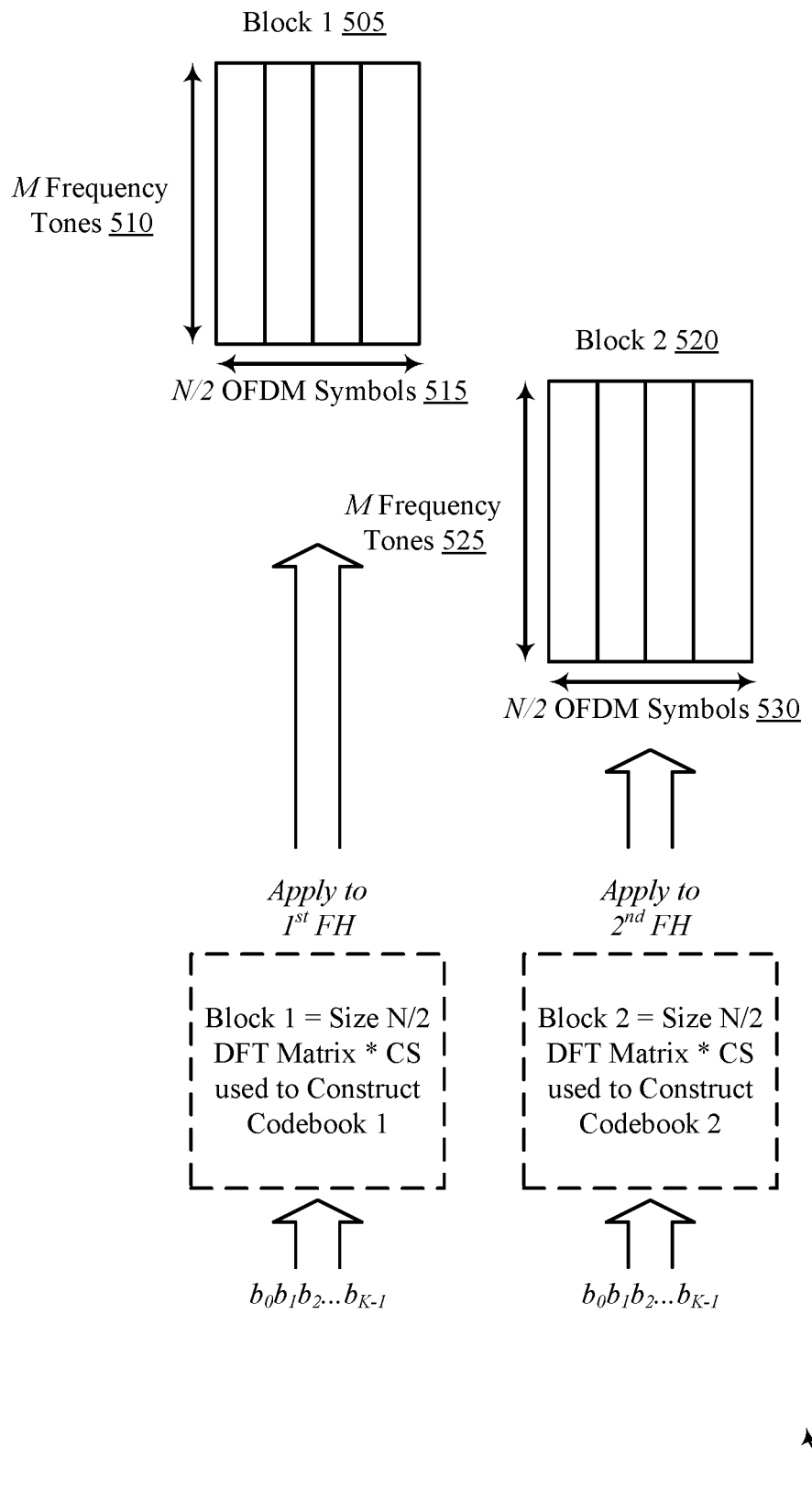
FIG. 5 illustrates an example of a matrix configuration that supports block matrix generation for sequence based transmissions in accordance with aspects of the present disclosure.

FIG. 5 illustrates an example of a matrix configuration 500 that supports block matrix generation for sequence based transmissions in accordance with aspects of the present disclosure. In some examples, matrix configuration 500 may be implemented to realize aspects of wireless communication system 100 and wireless communication system 200 as well as orthogonal matrix 300 and matrix configuration 400. For example, a UE or a base station, or both, may use the matrix configuration 500 to generate a set of orthogonal sequences from which the UE may select an orthogonal sequence to convey a payload to the base station. The UE and the base station may be examples of corresponding devices as described herein.

As discussed above, aspects of the described techniques break an N*M matrix (e.g., a second orthogonal matrix) into L smaller block matrices (e.g., a plurality of first orthogonal matrices) where each block is orthogonal and the size of each block is (N*M)/L. Each of the first codebook 505 and the second codebook 520 may include a plurality of orthogonal sequences. One block (e.g., each codebook) can transmit $$\text{floor } \log_2\left(\frac{N*M}{L}\right) = \text{floor } \log_2(N*M) - \log_2 L \text{ bits.}$$

L blocks can transmit in total L*floor $\log_2(N*M)-\log_2 L$. The network (e.g., via the base station) may choose, signal, or otherwise configure the parameter L as a trade-off between the UCI data rate and reliability, e.g., based on a SNR, congestion levels, throughput requirements, reliability requirements, and the like. That is, the value of the parameter L can be based on the channel quality metric in order to select the best tradeoff based on current conditions.

Accordingly, the base station may transmit configuration signaling to the UE indicating a parameter (e.g., L and/or other parameters) for generating a plurality of first orthogonal matrices (e.g., such as the first codebook 505 and the second codebook 520 of the plurality of codebooks). The first orthogonal matrices may be based on DFT=(N/L)*CS (M). The first codebook 505 may span M frequency tones 510 in the frequency domain (e.g., the DFT domain) and N/2 OFDM symbols 515 in the time domain (e.g., the CS domain). Similarly, the second codebook 520 may span M frequency tones 525 in the frequency domain (e.g., the DFT domain) and N/2 OFDM symbols 530 in the time domain (e.g., the CS domain).

The M frequency tones 510 of the first codebook 505 may include or span the same or a different number of tones as the M frequency tones 525 of the second codebook 520. Although illustrated as using different CS domain symbols, it is to be understood that the N/2 OFDM symbols 515 of the first codebook 505 may include or span the same or a different number of symbols as the N/2 frequency tones 525 of the second codebook 520. That is, the size of each orthogonal matrix is the plurality of orthogonal matrices may be based on a division of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols and M frequency tones configured for conveying a payload. The UE or base station, or both, may generate a plurality of codebooks corresponding to the plurality of first orthogonal matrices, such as the first codebook 505 and the second codebook 520. The UE may transmit (and base station may receive) a first portion of the payload using a first sequence from the first codebook 505 of the plurality of codebooks and a second portion of the payload using the second codebook 520 of the plurality of codebooks. That is, the UE may select a first sequence from the first codebook 505 to use for transmission of the first portion of the payload and select a second sequence from the second codebook 520 to use for transmission of the second portion of the payload.

Matrix configuration 500 illustrates an example where the first and second portions of the payload are transmitted according to a frequency hopping configuration. That is, frequency hopping may be enabled on PUCCH for the UE. Matrix configuration 500 illustrates an example where block-wise orthogonal sequence based PUCCH can be applied to generate two smaller blocks (in two frequency hops, respectively) to transmit the same UCI bits, e.g., to explore the frequency diversity for higher UCI transmission reliability. The base station may transmit or otherwise convey configuration signaling to the UE that identifies or otherwise indicates the ordering to the first and second portions of bits that is based on the frequency hopping configuration, e.g., the mapping between the first/second portions of bits to the first/second frequency hops.

As one example where there are 13 N OFDM symbols for the second orthogonal matrix, with frequency hopping the first codebook 505 may have a size of DFT(7)*CS (e.g., span 7 symbols) and the second codebook 520 may have a size of DFT(6)*CS (e.g., span 6 symbols). Thus, the second codebook 520 may be smaller in size than the first codebook 505. To transmit the same two bits in the first and second codebooks, four codepoints may be selected from the DFT matrix for the first codebook 505 and four codepoints may be selected from the DFT matrix for the second codebook 520. The bits to be transmitted, in this example, are $b_0$ and $b_1$ and are equal to "00." The UE may pick the first entry from the first codebook 505 and the second codebook 520, but these codepoints may be different. However, this may work since the first frequency portion or hop may use the first codebook 505 and the second frequency portion or hop may use the second codebook. Moreover, as the base station is generating the same codebooks as the UE, it may be in sync with the UE and therefore be able to receive the appropriate bits.

That is, the base station may transmit configuration signaling to the UE indicating an ordering of the first subset of bits and the second subset of bits based on the frequency hopping configuration. For example, relevant standards may provide a mapping to be followed, with the base station providing an index or other indicator to a particular mapping. For example, the mapping may correspond to the first portion of the payload being mapped to a first frequency portion associated with the frequency hopping configuration, the second portion of the payload to a second frequency portion of the frequency hopping configuration, and so forth. In some aspects, the ordering for the portions being mapped may be based from MSB to LSB, or vice versa. In other examples, the base station may explicitly transmit the mapping indication to the UE.

Matrix configuration 500 illustrates an example where the first portion of the payload and the second portion of the payload are the same bits, e.g., the same UCI bits. That is, the first portion of the payload and the second portion of the payload each include bits $b_0, b_1, b_2, \ldots, b_{K-1}$.

Accordingly, the UE may transmit the first portion of the payload (e.g., based on the first codebook 505) over the first frequency portion and the second portion of the payload (e.g., based on the second codebook 520) over the second frequency portion of the frequency hopping configuration to the base station. The base station may receive each portion of the payload (e.g., multiple subsets or portions of bits) according to the plurality of codebooks corresponding to the plurality of first orthogonal matrices.

Figure 6:
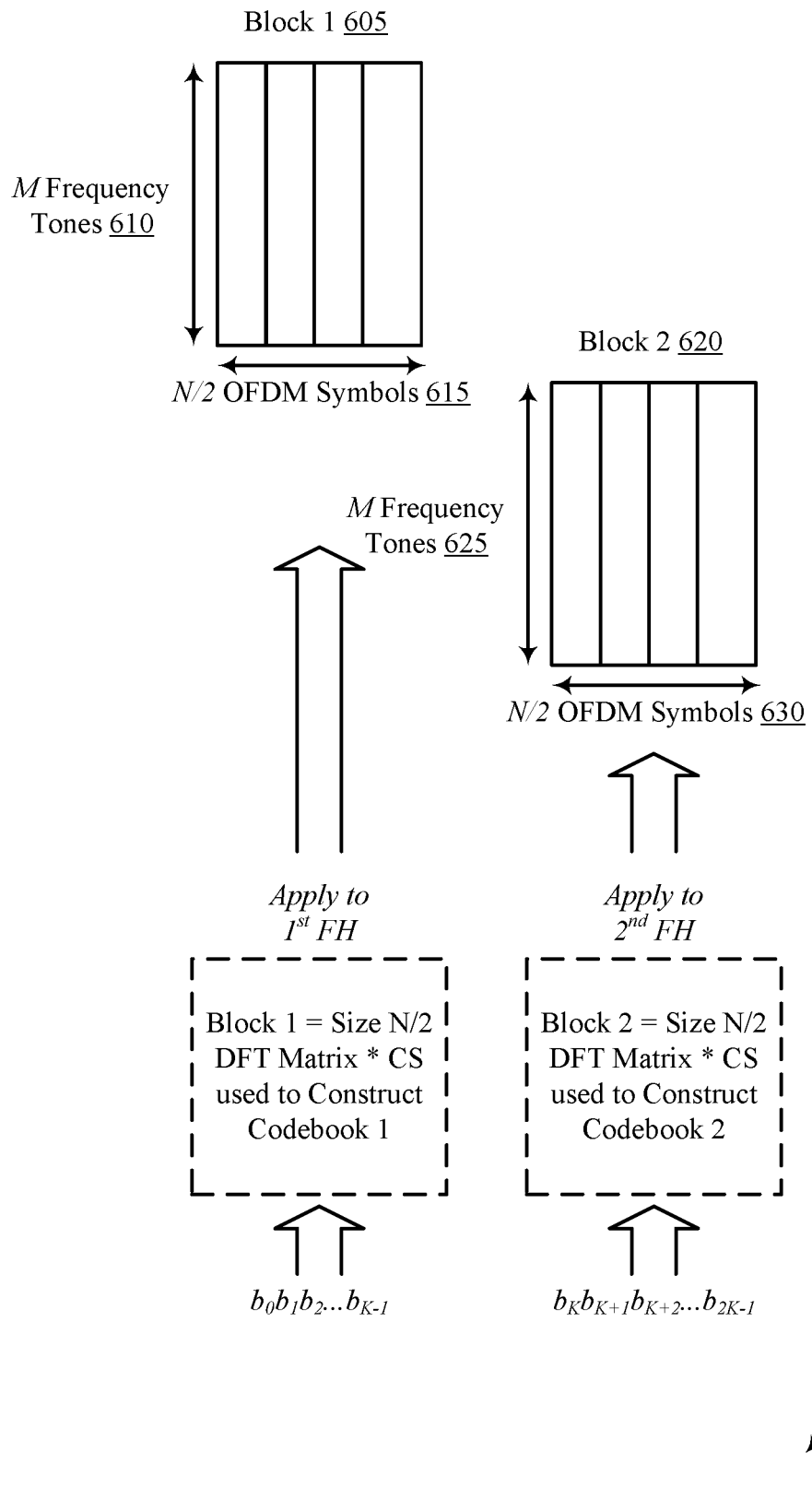
FIG. 6 illustrates an example of a matrix configuration that supports block matrix generation for sequence based transmissions in accordance with aspects of the present disclosure.

FIG. 6 illustrates an example of a matrix configuration 600 that supports block matrix generation for sequence based transmissions in accordance with aspects of the present disclosure. In some examples, matrix configuration 600 may be implemented to realize aspects of wireless communication system 100 and wireless communication system 200 as well as orthogonal matrix 300 and matrix configurations 400 and/or 500. For example, a UE or a base station, or both, may use the matrix configuration 600 to generate a set of orthogonal sequences from which the UE may select an orthogonal sequence to convey a payload to the base station. The UE and the base station may be examples of corresponding devices as described herein.

As discussed above, aspects of the described techniques break an N*M matrix (e.g., a second orthogonal matrix) into L smaller block matrices (e.g., a plurality of first orthogonal matrices) where each block is orthogonal and the size of each block is (N*M)/L. Each of the first codebook 605 and the second codebook 620 may include a plurality of orthogonal sequences. One block (e.g., each codebook) can transmit $$\text{floor } \log_2\left(\frac{N*M}{L}\right) = \text{floor } \log_2(N*M) - \log_2 L \text{ bits.}$$

L blocks can transmit in total L*floor $\log_2(N*M) - \log_2 L$. The network (e.g., via the base station) may choose, signal, or otherwise configure the parameter L as a trade-off between the UCI data rate and reliability, e.g., based on a SNR, congestion levels, throughput requirements, reliability requirements, and the like. That is, the value of the parameter L can be based on the channel quality metric in order to select the best tradeoff based on current conditions.

Accordingly, the base station may transmit configuration signaling to the UE indicating a parameter (e.g., L and/or other parameters) for generating a plurality of first orthogonal matrices (e.g., such as the first codebook 605 and the second codebook 620 of the plurality of codebooks). The first orthogonal matrices may be based on DFT=(N/L)*CS (M). The first codebook 605 may span M frequency tones 610 in the frequency domain (e.g., the DFT domain) and N/2 OFDM symbols 615 in the time domain (e.g., the CS domain). Similarly, the second codebook 620 may span M frequency tones 625 in the frequency domain (e.g., the DFT domain) and N/2 OFDM symbols 630 in the time domain (e.g., the CS domain).

The M frequency tones 610 of the first codebook 605 may include or span the same or a different number of tones as the M frequency tones 625 of the second codebook 620. Although illustrated as using different CS domain symbols, it is to be understood that the N/2 OFDM symbols 615 of the first codebook 605 may include or span the same or a different number of symbols as the N/2 frequency tones 625 of the second codebook 620. That is, the size of each orthogonal matrix is the plurality of orthogonal matrices may be based on a division of the size of the second orthogonal matrix.

The plurality of first orthogonal matrices may be based on a second orthogonal matrix (e.g., as discussed above and based on DFT(N)*CS(M)) where a size of the second orthogonal matrix is based on the number of N OFDM symbols and M frequency tones configured for conveying a payload. The UE or base station, or both, may generate a plurality of codebooks corresponding to the plurality of first orthogonal matrices, such as the first codebook 605 and the second codebook 620. The UE may transmit (and base station may receive) a first portion of the payload using a first sequence from the first codebook 605 of the plurality of codebooks and a second portion of the payload using the second codebook 620 of the plurality of codebooks. That is, the UE may select a first sequence from the first codebook 605 to use for transmission of the first portion of the payload and select a second sequence from the second codebook 620 to use for transmission of the second portion of the payload.

Matrix configuration 600 illustrates an example where the first and second portions of the payload are transmitted according to a frequency hopping configuration. That is, frequency hopping may be enabled on PUCCH for the UE. Matrix configuration 600 illustrates an example where block-wise orthogonal sequence based PUCCH can be applied to generate two smaller blocks (in two frequency hops, respectively) to transmit different UCI bits, e.g., to increase UCI transmission capacity. The base station may transmit or otherwise convey configuration signaling to the UE that identifies or otherwise indicates the ordering to the first and second portions of bits that is based on the frequency hopping configuration, e.g., the mapping between the first/second portions of bits to the first/second frequency hops.

That is, the base station may transmit configuration signaling to the UE indicating an ordering of the first subset of bits and the second subset of bits based on the frequency hopping configuration. For example, relevant standards may provide a mapping to be followed, with the base station providing an index or other indicator to a particular mapping. For example, the mapping may correspond to the first portion of the payload being mapped to a first frequency portion associated with the frequency hopping configuration, the second portion of the payload to a second frequency portion of the frequency hopping configuration, and so forth. In some aspects, the ordering for the portions being mapped may be based from MSB to LSB, or vice versa. In other examples, the base station may explicitly transmit the mapping indication to the UE.

Matrix configuration 600 illustrates an example where the first portion of the payload and the second portion of the payload are different bits, e.g., the different portions of the UCI bits. That is, the first portion of the payload may include bits $b_0, b_1, b_2, \ldots, b_{K-1}$ and the second portion of the payload may include bits $b_K, b_K+1, b_{K+2}, \ldots, b_{2K-1}$. Accordingly, the first portion of the payload includes a first subset of bits of the payload and the second portion of the payload includes a second subset of bits of the payload.

Accordingly, the UE may transmit the first portion of the payload (e.g., based on the first codebook 605) over the first frequency portion and the second portion of the payload (e.g., based on the second codebook 620) over the second frequency portion of the frequency hopping configuration to the base station. The base station may receive each portion of the payload (e.g., multiple subsets or portions of bits) according to the plurality of codebooks corresponding to the plurality of first orthogonal matrices and the frequency hopping configuration.

Figure 7:
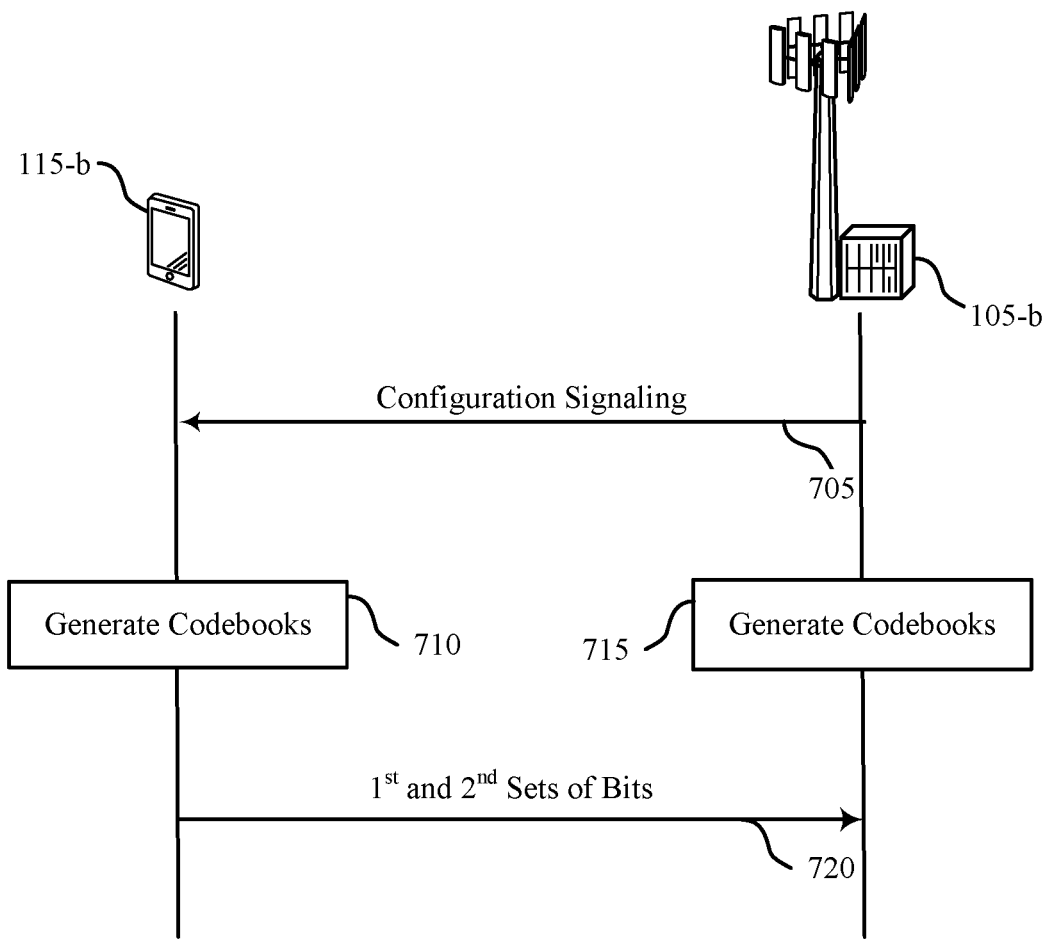
FIG. 7 illustrates an example of a process that supports block matrix generation for sequence based transmissions in accordance with aspects of the present disclosure.

FIG. 7 illustrates an example of a process 700 that supports block matrix generation for sequence based transmissions in accordance with aspects of the present disclosure. In some examples, process 700 may implement aspects of wireless communication systems 100 and/or 200, orthogonal matrix 300, and/or matrix configurations 400, 500, and/or 600. Aspects of process 700 may be implemented by UE 115-b and/or base station 105-b, which may be examples of the corresponding devices described herein.

At 705, base station 105-b may transmit (and UE 115-b may receive) a configuration signaling indicating the parameter for generating a plurality of first orthogonal matrices. In some aspects, the plurality of first orthogonal matrices may be based on a second orthogonal matrix. The size of the second orthogonal matrix may be based on a number of one or more time periods (e.g., N OFDM symbols) configured for conveying a payload and the number of one or more frequency tones (e.g., M frequency tones) configured for conveying the payload.

In some aspects, each orthogonal matrix may be based on a product of a third orthogonal matrix (e.g., the DFT matrix) and a cyclically shifted matrix (e.g., CS). The size of the third orthogonal matrix may be based on the parameter and the number of one or more time periods configured for conveying the payload. The length of the cyclically shifted matrix may be based on the number of one or more frequency tones configured for conveying the payload.

In some aspects, the second orthogonal matrix may include a plurality of orthogonal sequences that are based on a product of the third orthogonal matrix having a size corresponding to the number of one or more time periods and a cyclically shifted cell-specific sequence (e.g., CS) having a length corresponding to the number of one or more frequency tones. In this example, the third orthogonal matrix may include a DFT matrix and the product may include a Kronecker product.

At 710, UE 115-d may generate a plurality of codebooks corresponding to the plurality of first orthogonal matrices. Similarly and that 715, base station 105-b may generate the plurality of codebooks corresponding to the plurality of first orthogonal matrices. As base station 105-d signaled the indication of the parameter to UE 115-b, each device may generate the same plurality of codebooks.

In some aspects, base station 105-b may transmit (and UE 115-b may receive) a configuration signaling indicating whether the first portion of the payload and the second portion of the payload of the same set of bits or different subsets of the bits.

At 720, UE 115-d may transmit (and base station 105-b may receive) a first portion of the payload using a first sequence from a first codebook of the plurality of codebooks and a second portion of the payload using a second codebook of the plurality of codebooks. In some aspects, the payload may be a UCI message.

In some aspects, this may include UE 115-b transmitting (and base station 105-b receiving) a first portion of the payload over a first frequency portion of a frequency hopping configuration and the second portion of the payload over a second frequency portion of the frequency hopping configuration. In this example, the first portion of the payload and the second portion of the payload may include the same set of bits or may include different subsets of bits (e.g., the first portion of the payload may include a first subset of bits of the payload and the second portion of the payload may include a second subset of bits of the payload). In some aspects, this may include base station 105-b transmitting (and UE 115-b receiving) a configuration signal indicating an ordering of the first subset of bits and the second subset of bits based on the frequency hopping configuration.

Figure 8:
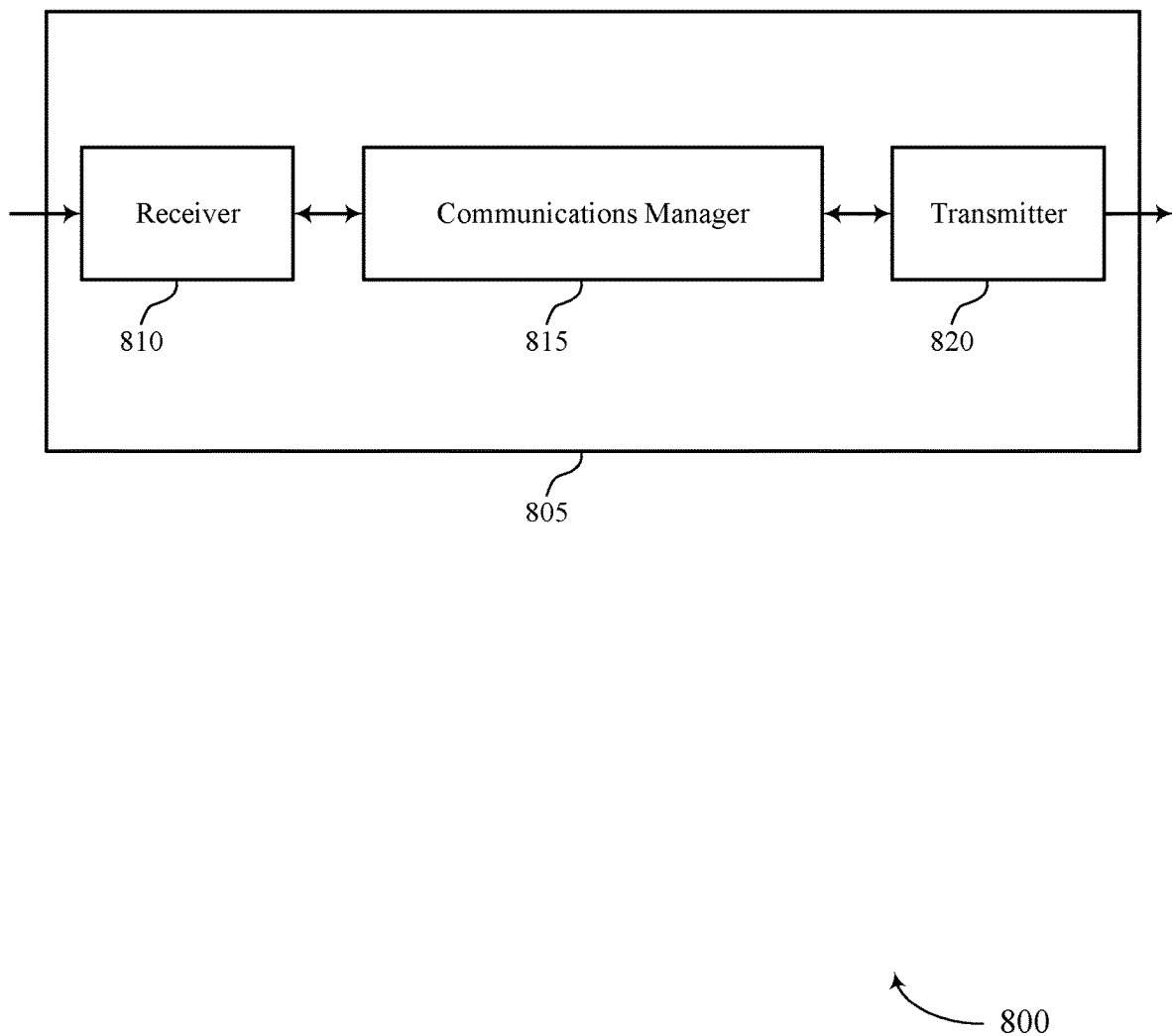
FIGS. 8 and 9 show block diagrams of devices that support block matrix generation for sequence based transmissions in accordance with aspects of the present disclosure.

FIG. 8 shows a block diagram 800 of a device 805 that supports block matrix generation for sequence based transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to block matrix generation for sequence based transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and transmit a first portion the payload using a first sequence from a first codebook of the set of codebooks and a second portion of the payload using a second codebook of the set of codebooks. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
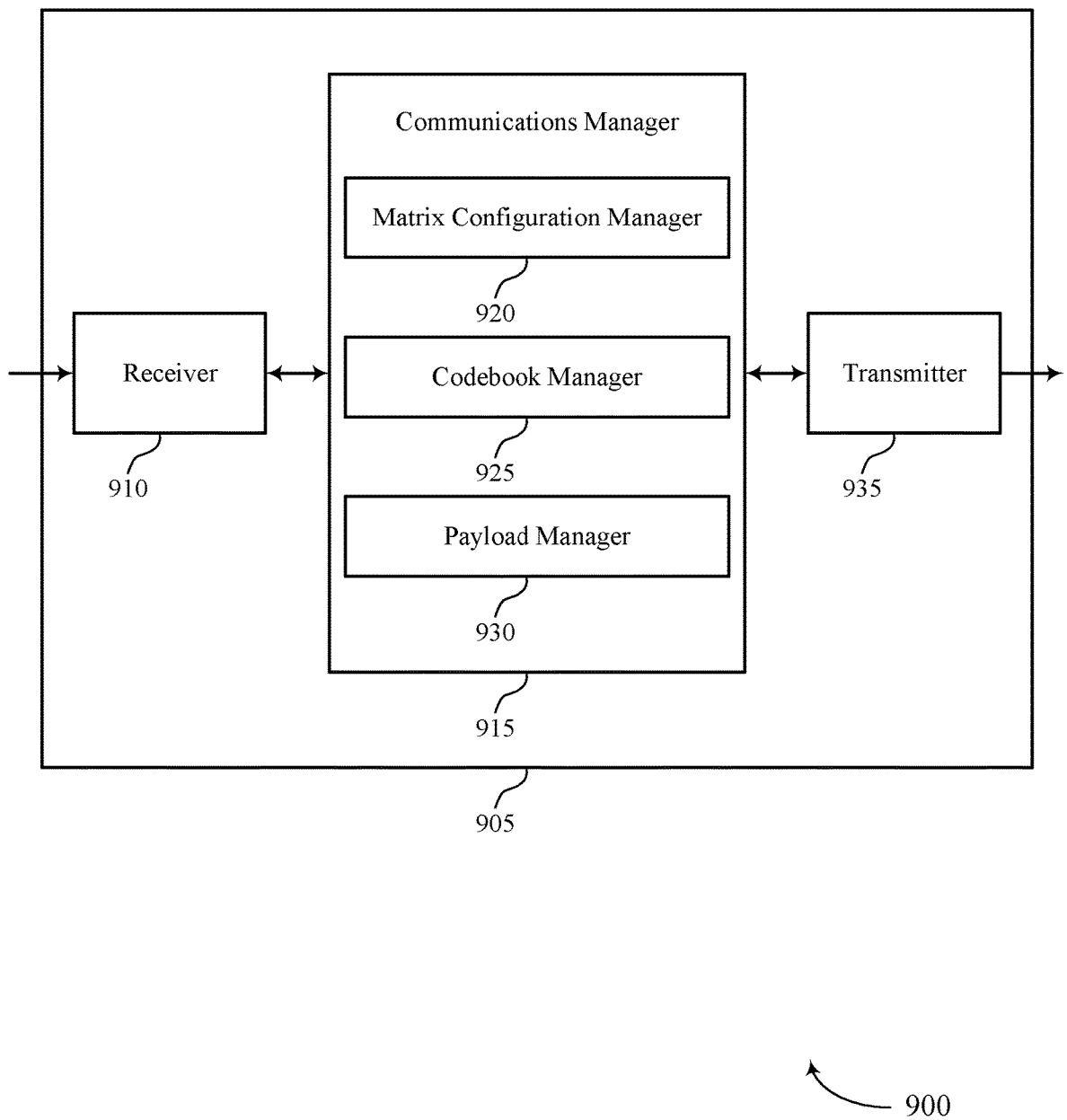

FIG. 9 shows a block diagram 900 of a device 905 that supports block matrix generation for sequence based transmissions in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to block matrix generation for sequence based transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a matrix configuration manager 920, a codebook manager 925, and a payload manager 930. The communications manager 915 may be an example of aspects of the communications manager 1110 described herein.

The matrix configuration manager 920 may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload.

The codebook manager 925 may generate a set of codebooks corresponding to the set of first orthogonal matrices.

The payload manager 930 may transmit a first portion the payload using a first sequence from a first codebook of the set of codebooks and a second portion of the payload using a second codebook of the set of codebooks.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
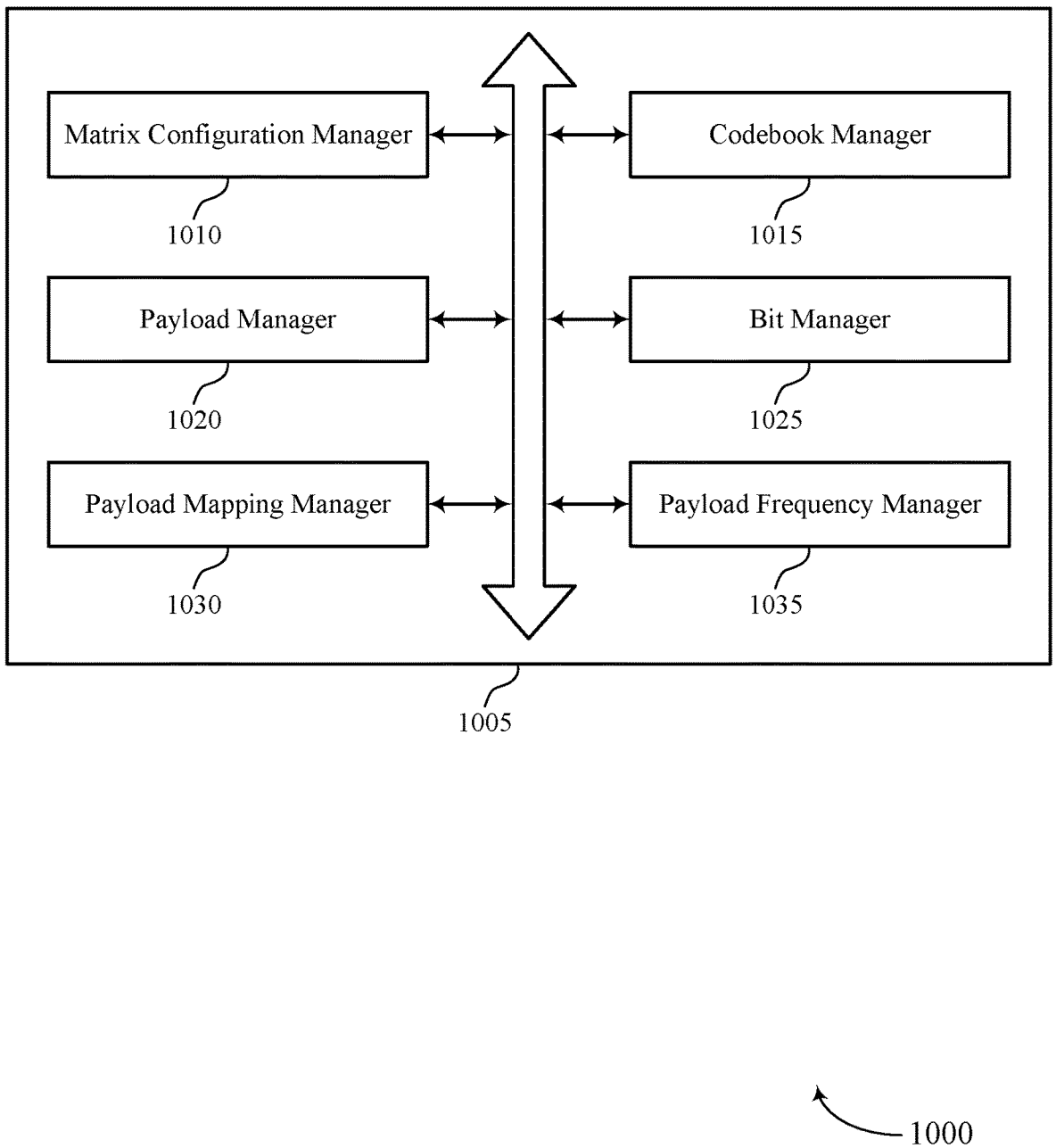
FIG. 10 shows a block diagram of a communications manager that supports block matrix generation for sequence based transmissions in accordance with aspects of the present disclosure.

FIG. 10 shows a block diagram 1000 of a communications manager 1005 that supports block matrix generation for sequence based transmissions in accordance with aspects of the present disclosure. The communications manager 1005 may be an example of aspects of a communications manager 815, a communications manager 915, or a communications manager 1110 described herein. The communications manager 1005 may include a matrix configuration manager 1010, a codebook manager 1015, a payload manager 1020, a bit manager 1025, a payload mapping manager 1030, and a payload frequency manager 1035. Each of these modules may communicate, directly or indirectly, with one another (e.g., via one or more buses).

The matrix configuration manager 1010 may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload.

In some cases, each first orthogonal matrix is based on a product of a third orthogonal matrix and a cyclically shifted matrix, where a size of the third orthogonal matrix is based on the parameter and the number of one or more time periods configured for conveying the payload, and where a length of the cyclically shifted matrix is based on the number of one or more frequency tones configured for conveying the payload. In some cases, a size of each first orthogonal matrix of the set of orthogonal matrices is based on a division of the size of the second orthogonal matrix by the parameter. In some cases, each first orthogonal matrix of the set of orthogonal matrices includes a set of orthogonal sequences. In some cases, a value of the parameter is based on a channel quality metric.

In some cases, the second orthogonal matrix includes a set of orthogonal sequences that are based on a product of a third orthogonal matrix having a size corresponding to the number of one or more time periods and a cyclically shifted cell-specific sequence having a length corresponding to the number of one or more frequency tones. In some cases, the third orthogonal matrix includes a DFT matrix. In some cases, the product includes a Kronecker product.

The codebook manager 1015 may generate a set of codebooks corresponding to the set of first orthogonal matrices.

The payload manager 1020 may transmit a first portion the payload using a first sequence from a first codebook of the set of codebooks and a second portion of the payload using a second codebook of the set of codebooks. In some cases, the payload includes an uplink control information message.

The bit manager 1025 may receive configuration signaling indicating whether the first portion of the payload and the second portion of the payload are a same set of bits or different subsets of the payload.

The payload mapping manager 1030 may receive configuration signaling indicating a mapping between the first portion of the payload, the second portion of the payload, and the set of codebooks.

The payload frequency manager 1035 may transmit the first portion of the payload over a first frequency portion associated with a frequency hopping configuration and the second portion of the payload over a second frequency portion associated with the frequency hopping configuration. In some examples, the payload frequency manager 1035 may receive configuration signaling indicating an ordering of the first subset of bits and the second subset of bits that is based on the frequency hopping configuration. In some cases, the first portion of the payload and the second portion of the payload include a same set of bits. In some cases, the first portion of the payload include a first subset of bits of the payload and the second portion of the payload include a second subset of bits of the payload.

Figure 11:
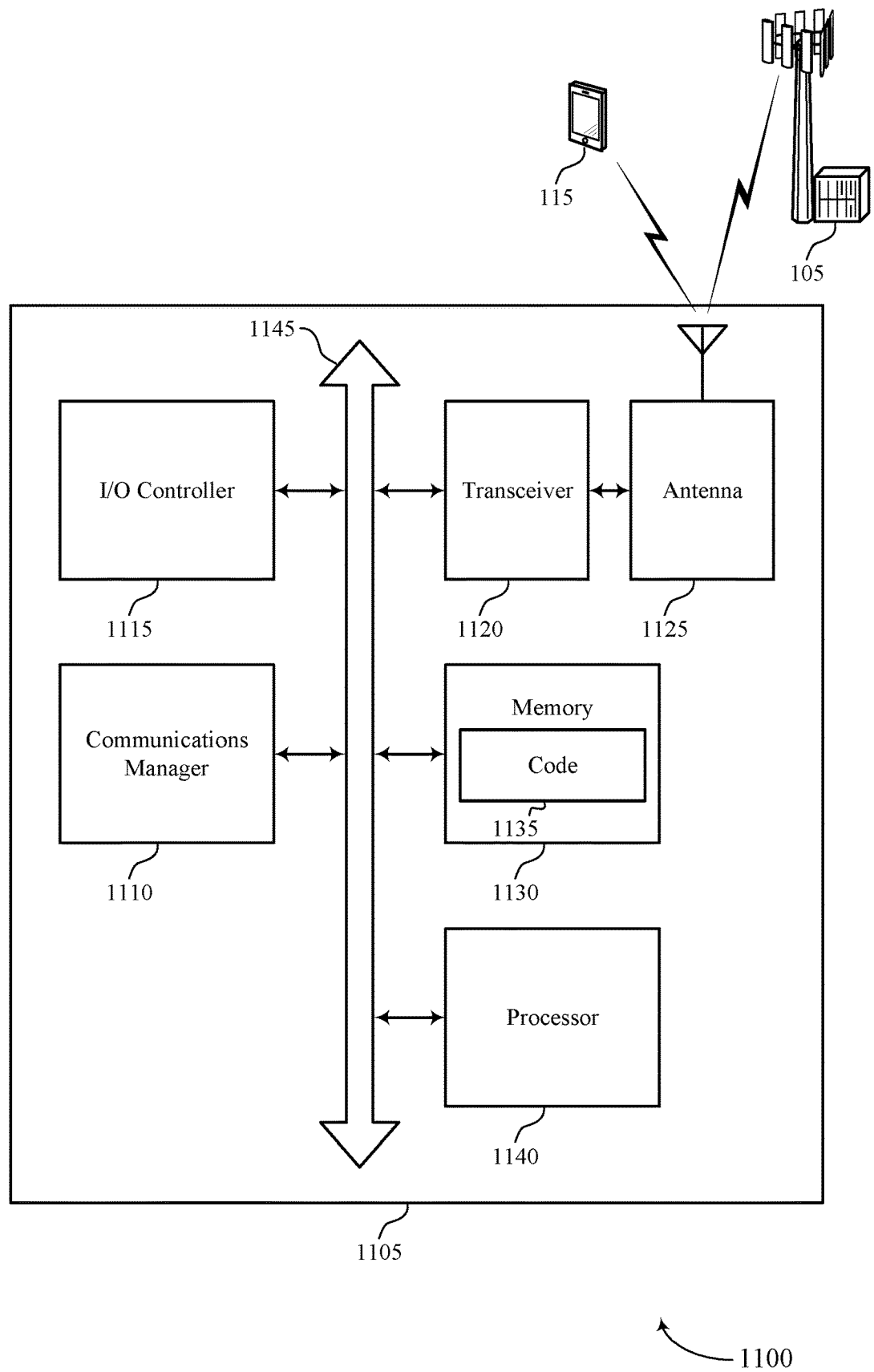
FIG. 11 shows a diagram of a system including a device that supports block matrix generation for sequence based transmissions in accordance with aspects of the present disclosure.

FIG. 11 shows a diagram of a system 1100 including a device 1105 that supports block matrix generation for sequence based transmissions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and transmit a first portion the payload using a first sequence from a first codebook of the set of codebooks and a second portion of the payload using a second codebook of the set of codebooks.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting block matrix generation for sequence based transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
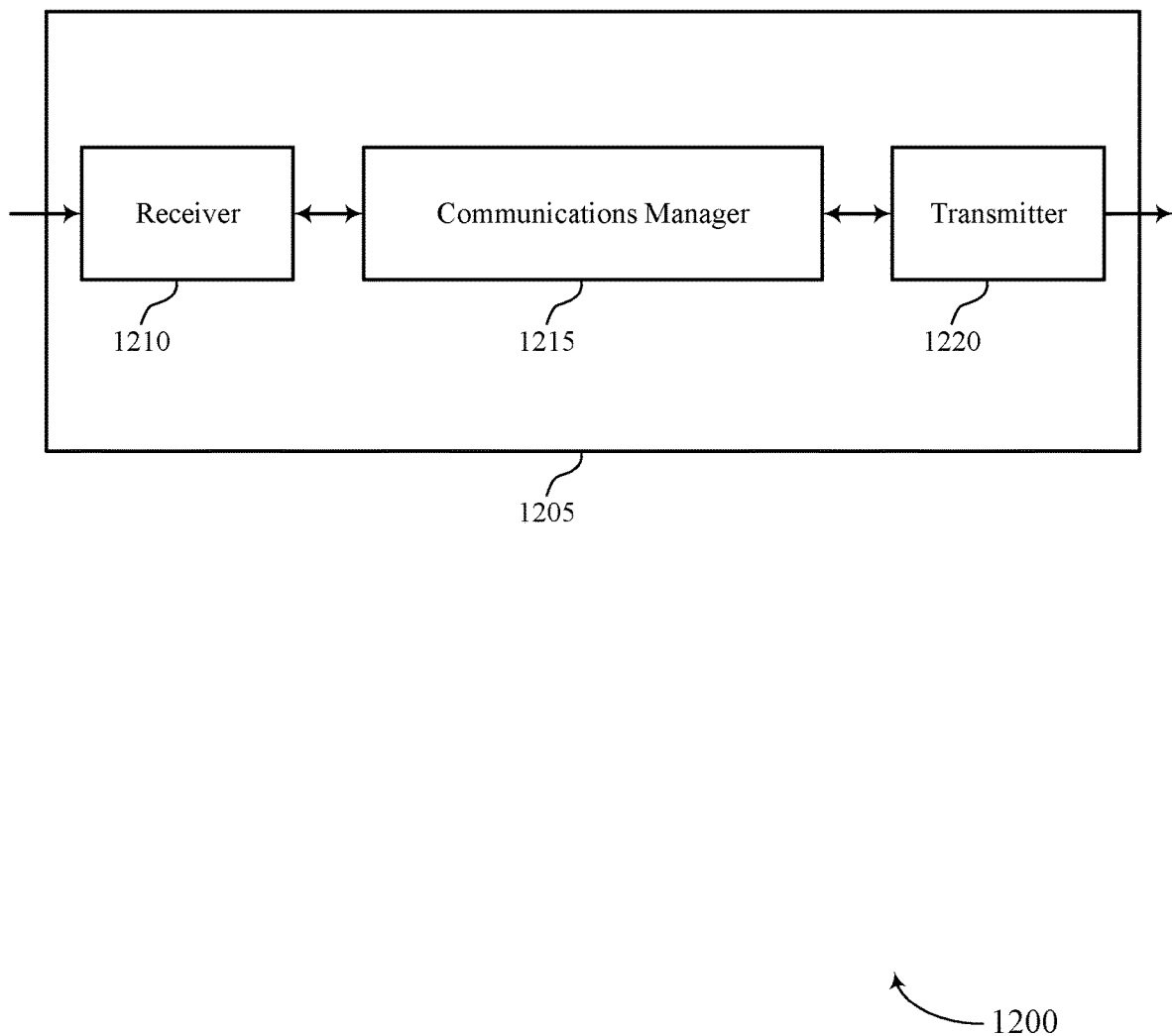
FIGS. 12 and 13 show block diagrams of devices that support block matrix generation for sequence based transmissions in accordance with aspects of the present disclosure.

FIG. 12 shows a block diagram 1200 of a device 1205 that supports block matrix generation for sequence based transmissions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to block matrix generation for sequence based transmissions, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and receive a first portion of the payload using a first sequence from a first codebook of the set of codebooks and a second portion of the payload using a second codebook of the set of codebooks. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
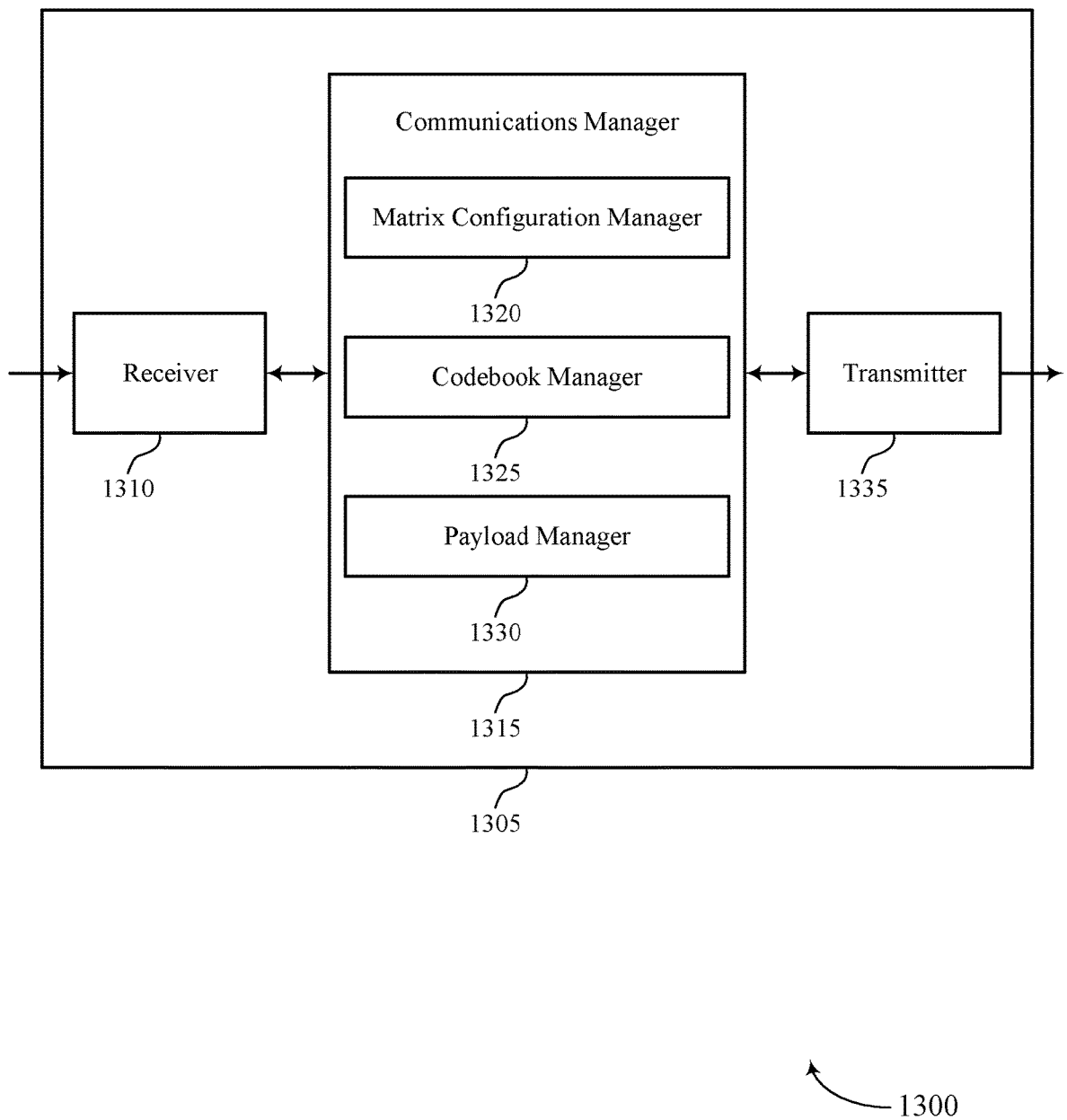

FIG. 13 shows a block diagram 1300 of a device 1305 that supports block matrix generation for sequence based transmissions in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to block matrix generation for sequence based transmissions, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a matrix configuration manager 1320, a codebook manager 1325, and a payload manager 1330. The communications manager 1315 may be an example of aspects of the communications manager 1510 described herein.

The matrix configuration manager 1320 may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload.

The codebook manager 1325 may generate a set of codebooks corresponding to the set of first orthogonal matrices.

The payload manager 1330 may receive a first portion of the payload using a first sequence from a first codebook of the set of codebooks and a second portion of the payload using a second codebook of the set of codebooks.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
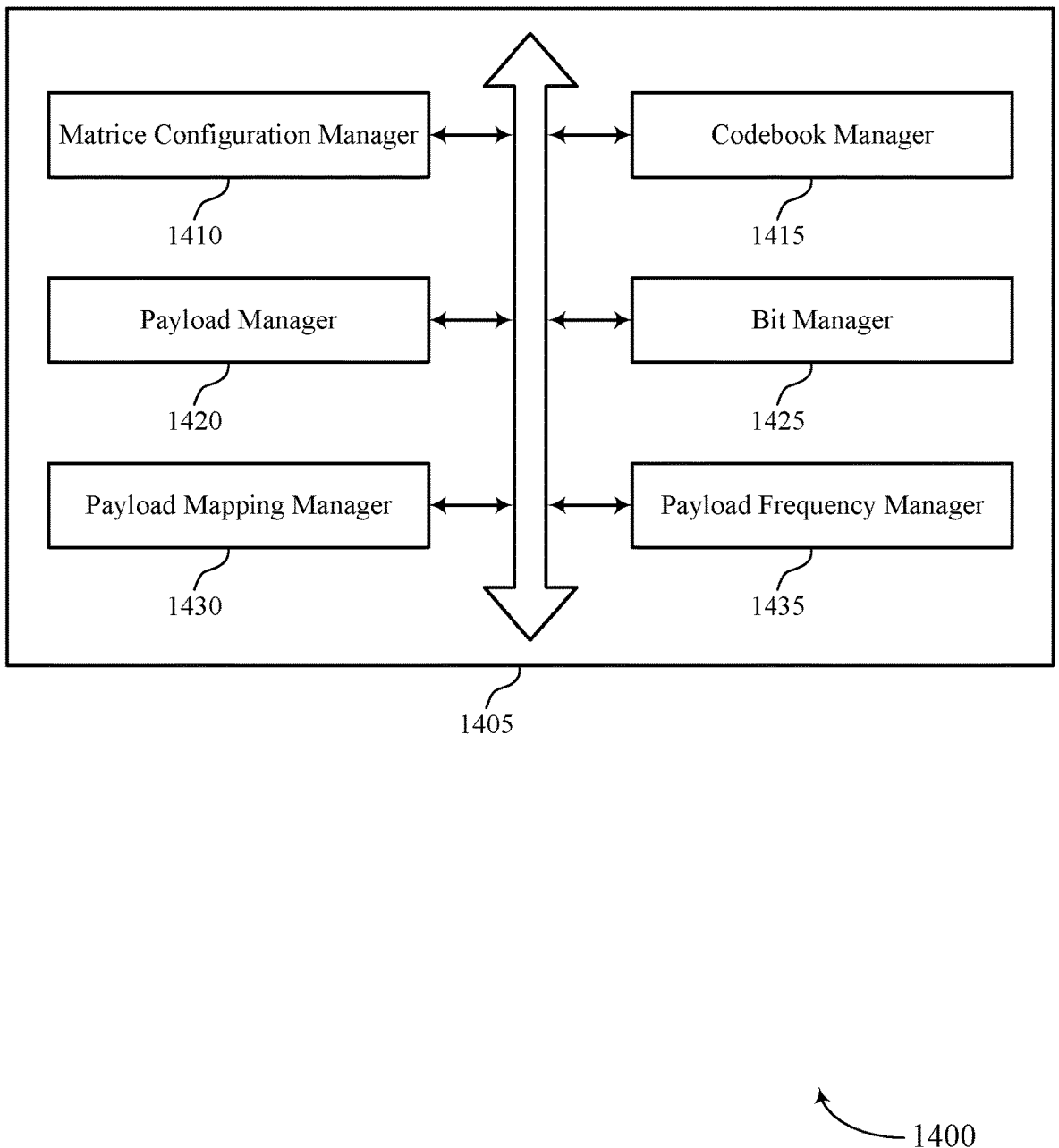
FIG. 14 shows a block diagram of a communications manager that supports block matrix generation for sequence based transmissions in accordance with aspects of the present disclosure.

FIG. 14 shows a block diagram 1400 of a communications manager 1405 that supports block matrix generation for sequence based transmissions in accordance with aspects of the present disclosure. The communications manager 1405 may be an example of aspects of a communications manager 1215, a communications manager 1315, or a communications manager 1510 described herein. The communications manager 1405 may include a matrix configuration manager 1410, a codebook manager 1415, a payload manager 1420, a bit manager 1425, a payload mapping manager 1430, and a payload frequency manager 1435. Each of these modules may communicate, directly or indirectly, with one another (e.g., via one or more buses).

The matrix configuration manager 1410 may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload.

In some cases, each first orthogonal matrix is based on a product of a third orthogonal matrix and a cyclically shifted matrix, where a size of the third orthogonal matrix is based on the parameter and the number of one or more time periods configured for conveying the payload, and where a length of the cyclically shifted matrix is based on the number of one or more frequency tones configured for conveying the payload. In some cases, a size of each first orthogonal matrix of the set of orthogonal matrices is based on a division of the size of the second orthogonal matrix by the parameter. In some cases, each first orthogonal matrix of the set of orthogonal matrices includes a set of orthogonal sequences. In some cases, a value of the parameter is based on a channel quality metric.

In some cases, the second orthogonal matrix includes a set of orthogonal sequences that are based on a product of a third orthogonal matrix having a size corresponding to the number of one or more time periods and a cyclically shifted cell-specific sequence having a length corresponding to the number of one or more frequency tones. In some cases, the third orthogonal matrix includes a DFT matrix. In some cases, the product includes a Kronecker product.

The codebook manager 1415 may generate a set of codebooks corresponding to the set of first orthogonal matrices.

The payload manager 1420 may receive a first portion of the payload using a first sequence from a first codebook of the set of codebooks and a second portion of the payload using a second codebook of the set of codebooks. In some cases, the payload includes an uplink control information message.

The bit manager 1425 may transmit configuration signaling indicating whether the first portion of the payload and the second portion of the payload are a same set of bits or different subsets of the payload.

The payload mapping manager 1430 may transmit configuration signaling indicating a mapping between the first portion of the payload, the second portion of the payload, and the set of codebooks.

The payload frequency manager 1435 may receive the first portion of the payload over a first frequency portion associated with a frequency hopping configuration and the second portion of the payload over a second frequency portion associated with the frequency hopping configuration. In some examples, the payload frequency manager 1435 may transmit configuration signaling indicating an ordering of the first subset of bits and the second subset of bits that is based on the frequency hopping configuration. In some cases, the first portion of the payload and the second portion of the payload include a same set of bits. In some cases, the first portion of the payload include a first subset of bits of the payload and the second portion of the payload include a second subset of bits of the payload.

Figure 15:
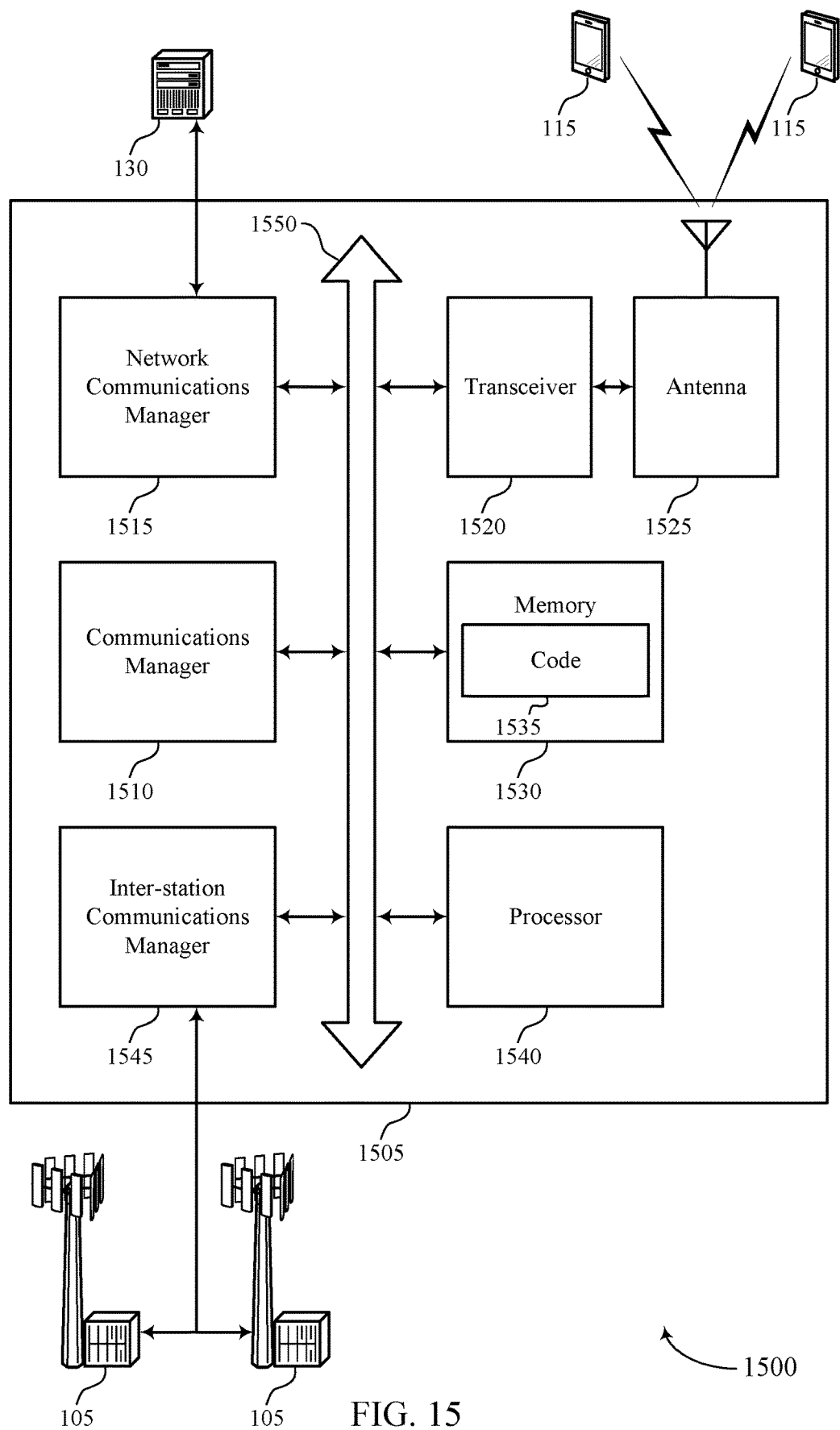
FIG. 15 shows a diagram of a system including a device that supports block matrix generation for sequence based transmissions in accordance with aspects of the present disclosure.

FIG. 15 shows a diagram of a system 1500 including a device 1505 that supports block matrix generation for sequence based transmissions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload, generate a set of codebooks corresponding to the set of first orthogonal matrices, and receive a first portion of the payload using a first sequence from a first codebook of the set of codebooks and a second portion of the payload using a second codebook of the set of codebooks.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting block matrix generation for sequence based transmissions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
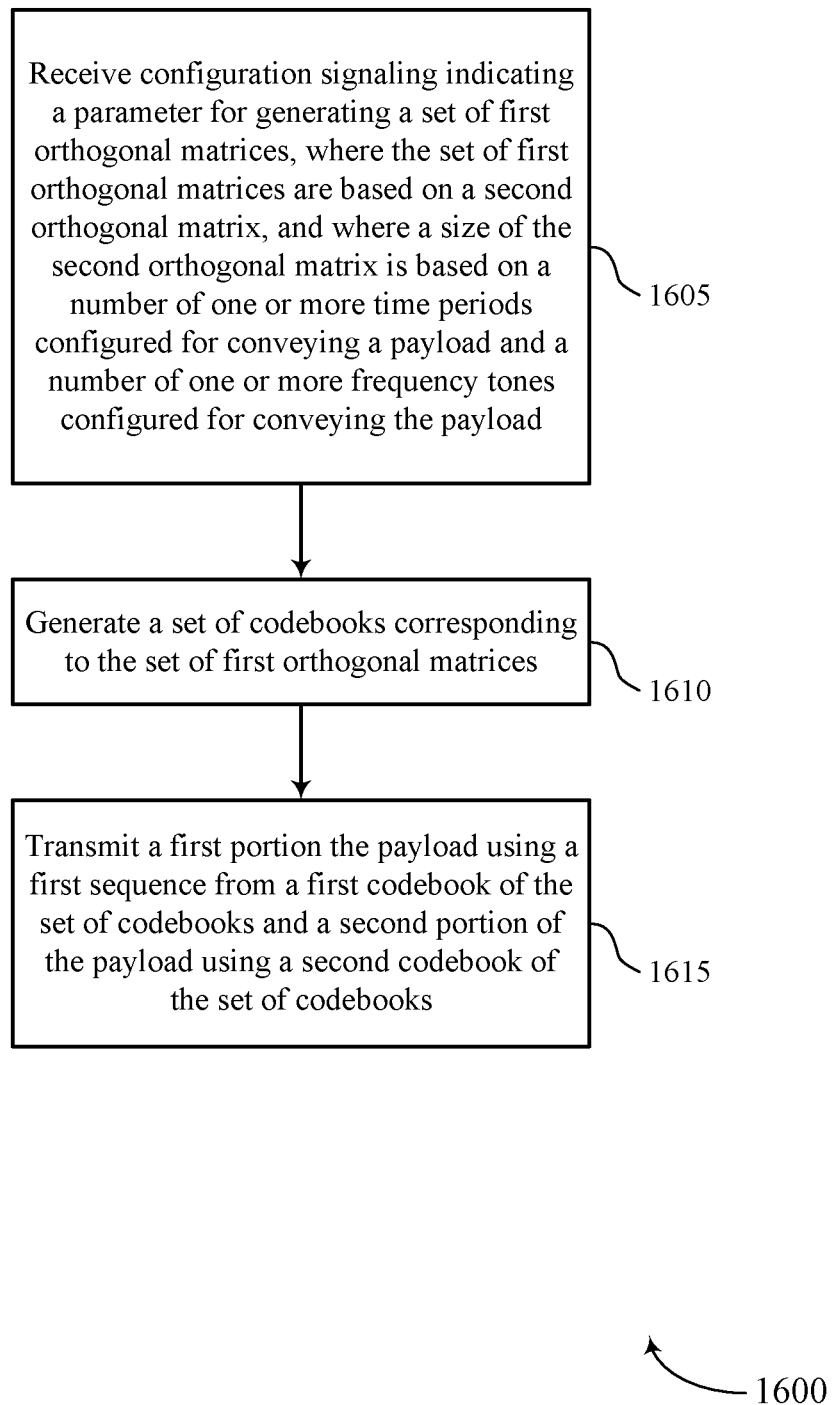
FIGS. 16 through 20 show flowcharts illustrating methods that support block matrix generation for sequence based transmissions in accordance with aspects of the present disclosure.

FIG. 16 shows a flowchart illustrating a method 1600 that supports block matrix generation for sequence based transmissions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload. The operations of 1605 may be performed according to the methods described herein. In some examples, aspects of the operations of 1605 may be performed by a matrix configuration manager as described with reference to FIGS. 8 through 11.

At 1610, the UE may generate a set of codebooks corresponding to the set of first orthogonal matrices. The operations of 1610 may be performed according to the methods described herein. In some examples, aspects of the operations of 1610 may be performed by a codebook manager as described with reference to FIGS. 8 through 11.

At 1615, the UE may transmit a first portion the payload using a first sequence from a first codebook of the set of codebooks and a second portion of the payload using a second codebook of the set of codebooks. The operations of 1615 may be performed according to the methods described herein. In some examples, aspects of the operations of 1615 may be performed by a payload manager as described with reference to FIGS. 8 through 11.

Figure 17:
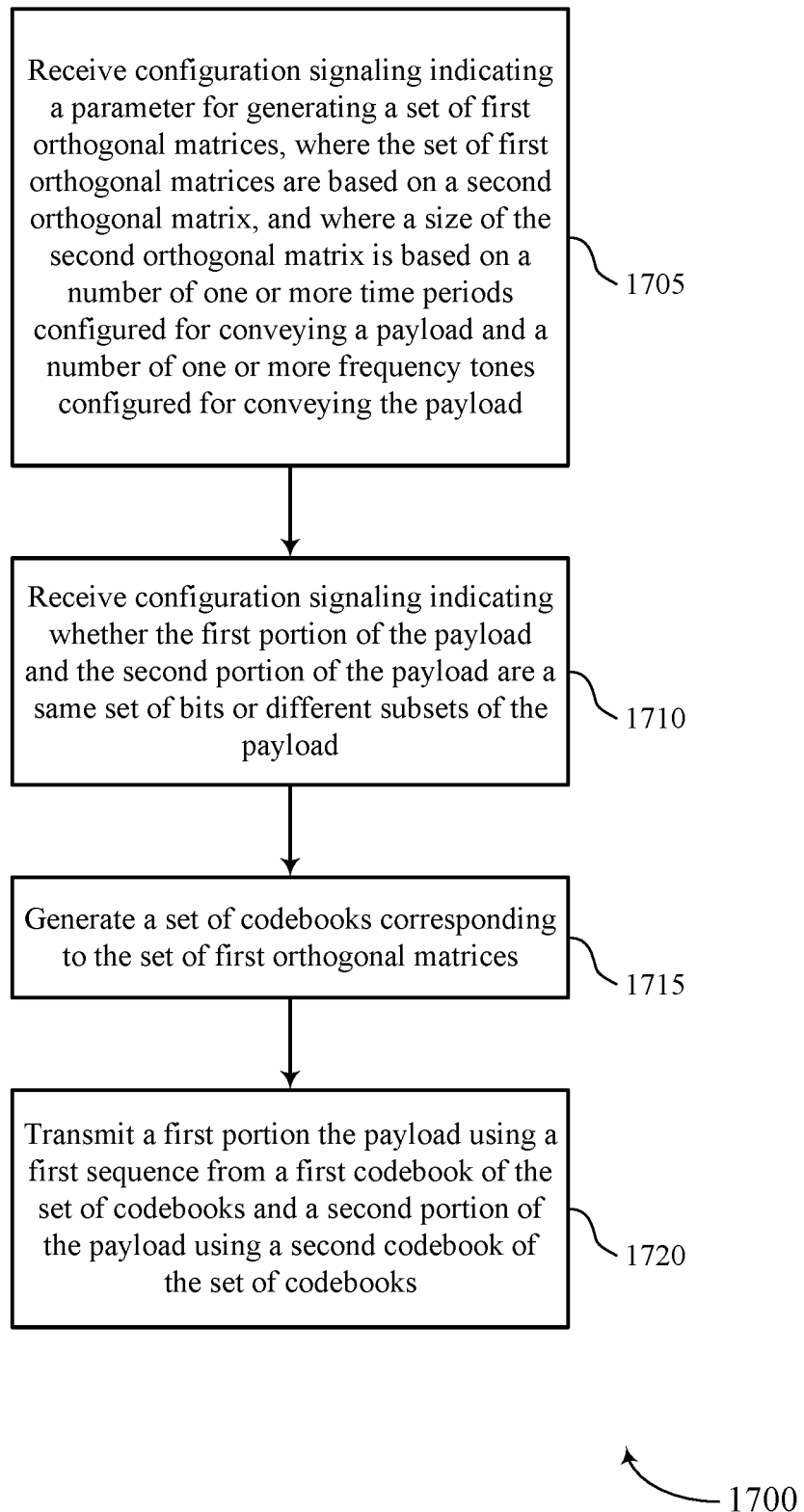

FIG. 17 shows a flowchart illustrating a method 1700 that supports block matrix generation for sequence based transmissions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload. The operations of 1705 may be performed according to the methods described herein. In some examples, aspects of the operations of 1705 may be performed by a matrix configuration manager as described with reference to FIGS. 8 through 11.

At 1710, the UE may receive configuration signaling indicating whether the first portion of the payload and the second portion of the payload are a same set of bits or different subsets of the payload. The operations of 1710 may be performed according to the methods described herein. In some examples, aspects of the operations of 1710 may be performed by a bit manager as described with reference to FIGS. 8 through 11.

At 1715, the UE may generate a set of codebooks corresponding to the set of first orthogonal matrices. The operations of 1715 may be performed according to the methods described herein. In some examples, aspects of the operations of 1715 may be performed by a codebook manager as described with reference to FIGS. 8 through 11.

At 1720, the UE may transmit a first portion the payload using a first sequence from a first codebook of the set of codebooks and a second portion of the payload using a second codebook of the set of codebooks. The operations of 1720 may be performed according to the methods described herein. In some examples, aspects of the operations of 1720 may be performed by a payload manager as described with reference to FIGS. 8 through 11.

Figure 18:
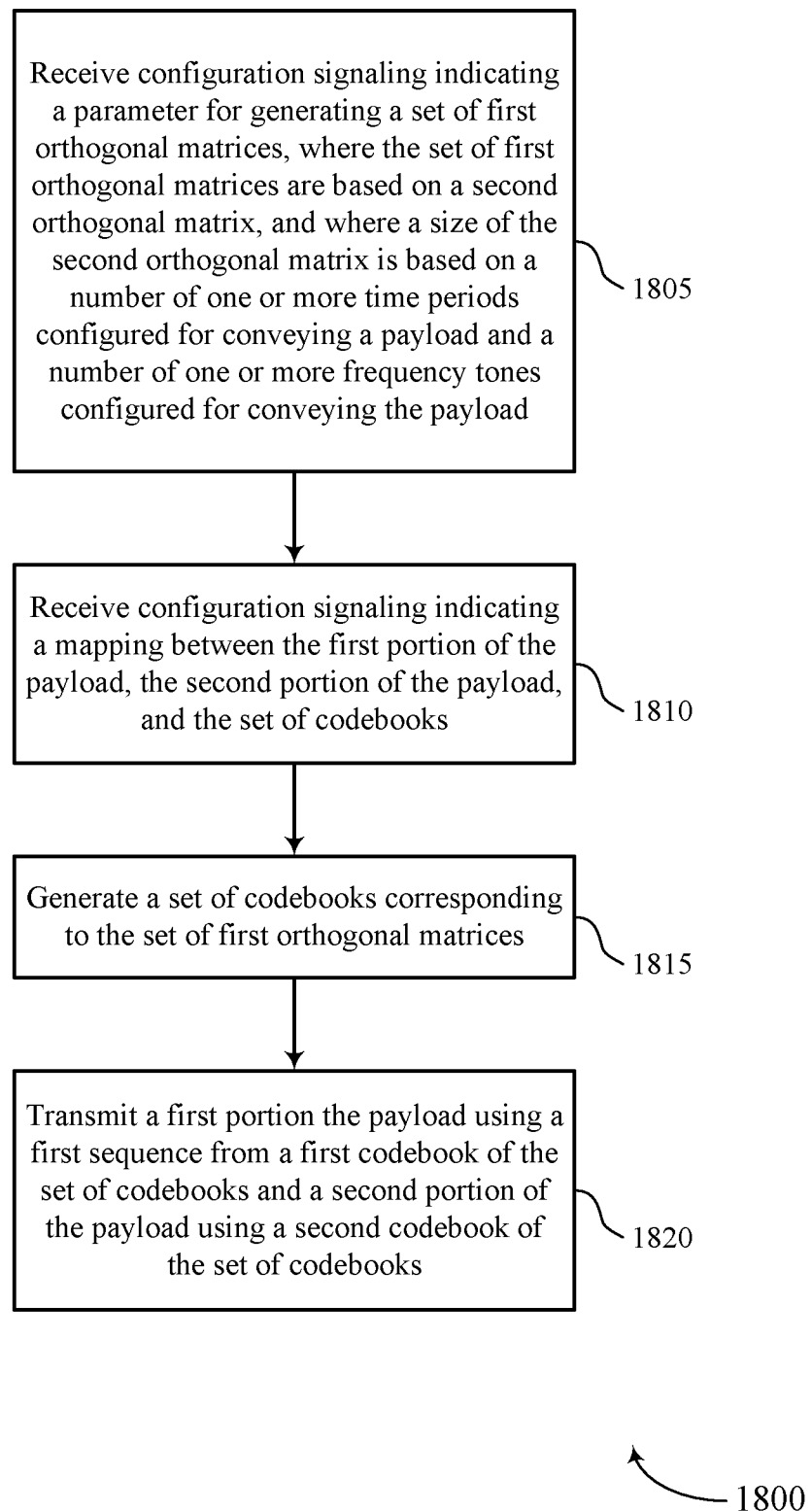

FIG. 18 shows a flowchart illustrating a method 1800 that supports block matrix generation for sequence based transmissions in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload. The operations of 1805 may be performed according to the methods described herein. In some examples, aspects of the operations of 1805 may be performed by a matrix configuration manager as described with reference to FIGS. 8 through 11.

At 1810, the UE may receive configuration signaling indicating a mapping between the first portion of the payload, the second portion of the payload, and the set of codebooks. The operations of 1810 may be performed according to the methods described herein. In some examples, aspects of the operations of 1810 may be performed by a payload mapping manager as described with reference to FIGS. 8 through 11.

At 1815, the UE may generate a set of codebooks corresponding to the set of first orthogonal matrices. The operations of 1815 may be performed according to the methods described herein. In some examples, aspects of the operations of 1815 may be performed by a codebook manager as described with reference to FIGS. 8 through 11.

At 1820, the UE may transmit a first portion the payload using a first sequence from a first codebook of the set of codebooks and a second portion of the payload using a second codebook of the set of codebooks. The operations of 1820 may be performed according to the methods described herein. In some examples, aspects of the operations of 1820 may be performed by a payload manager as described with reference to FIGS. 8 through 11.

Figure 19:
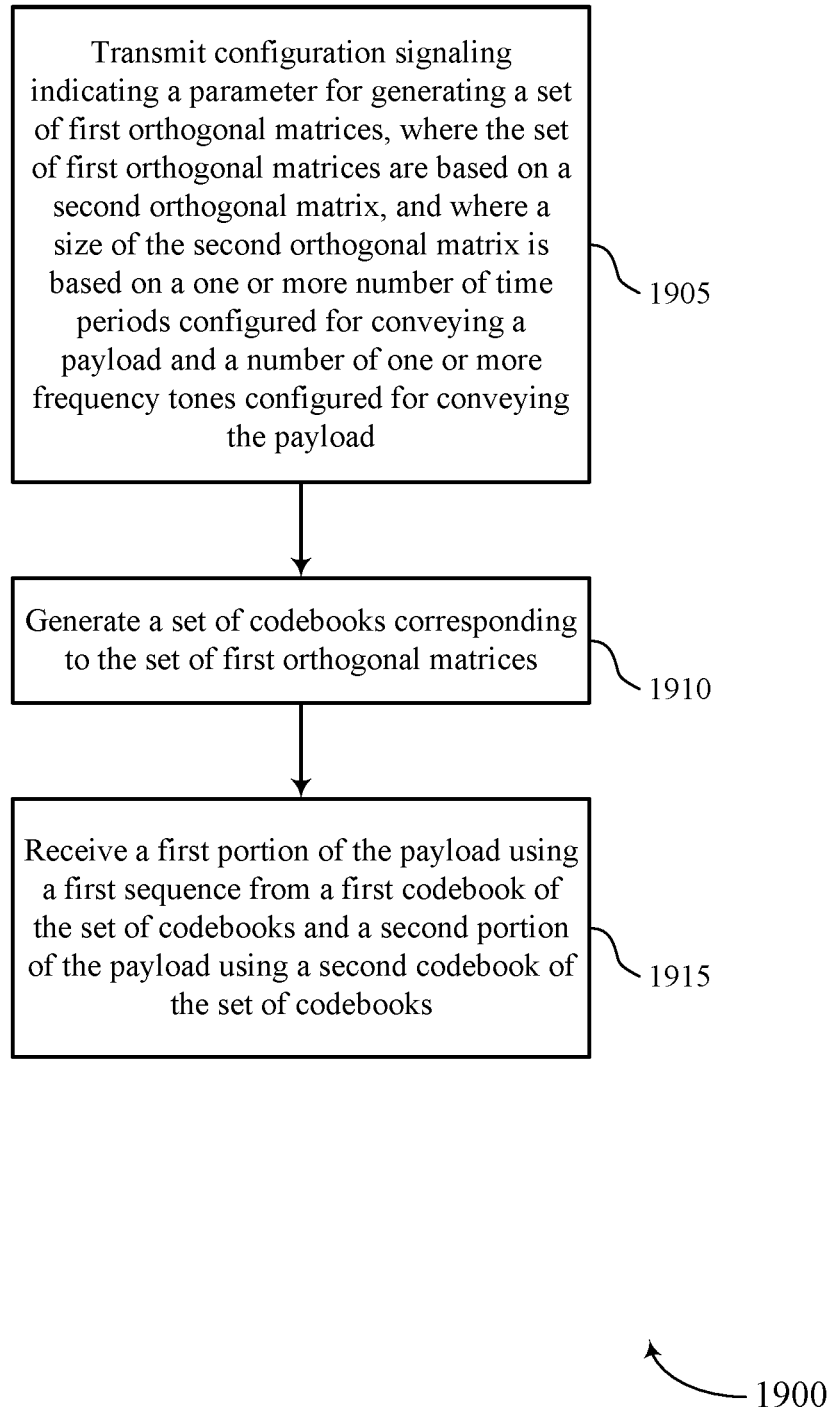

FIG. 19 shows a flowchart illustrating a method 1900 that supports block matrix generation for sequence based transmissions in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload. The operations of 1905 may be performed according to the methods described herein. In some examples, aspects of the operations of 1905 may be performed by a matrix configuration manager as described with reference to FIGS. 12 through 15.

At 1910, the base station may generate a set of codebooks corresponding to the set of first orthogonal matrices. The operations of 1910 may be performed according to the methods described herein. In some examples, aspects of the operations of 1910 may be performed by a codebook manager as described with reference to FIGS. 12 through 15.

At 1915, the base station may receive a first portion of the payload using a first sequence from a first codebook of the set of codebooks and a second portion of the payload using a second codebook of the set of codebooks. The operations of 1915 may be performed according to the methods described herein. In some examples, aspects of the operations of 1915 may be performed by a payload manager as described with reference to FIGS. 12 through 15.

Figure 20:
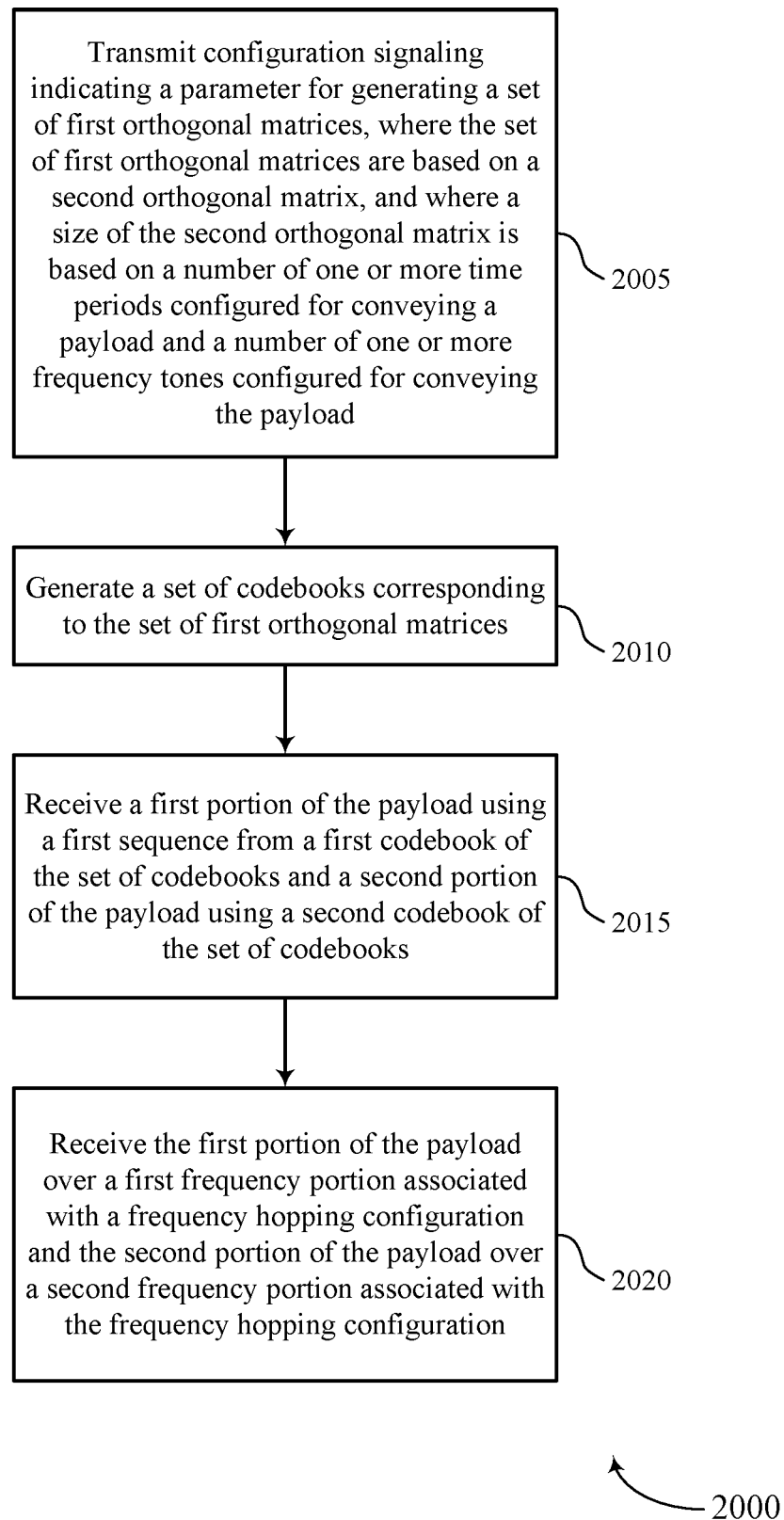

FIG. 20 shows a flowchart illustrating a method 2000 that supports block matrix generation for sequence based transmissions in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit configuration signaling indicating a parameter for generating a set of first orthogonal matrices, where the set of first orthogonal matrices are based on a second orthogonal matrix, and where a size of the second orthogonal matrix is based on a number of one or more time periods configured for conveying a payload and a number of one or more frequency tones configured for conveying the payload. The operations of 2005 may be performed according to the methods described herein. In some examples, aspects of the operations of 2005 may be performed by a matrix configuration manager as described with reference to FIGS. 12 through 15.

At 2010, the base station may generate a set of codebooks corresponding to the set of first orthogonal matrices. The operations of 2010 may be performed according to the methods described herein. In some examples, aspects of the operations of 2010 may be performed by a codebook manager as described with reference to FIGS. 12 through 15.

At 2015, the base station may receive a first portion of the payload using a first sequence from a first codebook of the set of codebooks and a second portion of the payload using a second codebook of the set of codebooks. The operations of 2015 may be performed according to the methods described herein. In some examples, aspects of the operations of 2015 may be performed by a payload manager as described with reference to FIGS. 12 through 15.

At 2020, the base station may receive the first portion of the payload over a first frequency portion associated with a frequency hopping configuration and the second portion of the payload over a second frequency portion associated with the frequency hopping configuration. The operations of 2020 may be performed according to the methods described herein. In some examples, aspects of the operations of 2020 may be performed by a payload frequency manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communications at a user equipment (UE), comprising: receiving configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload; generating a plurality of codebooks corresponding to the plurality of first orthogonal matrices; and transmitting a first portion the payload using a first sequence from a first codebook of the plurality of codebooks and a second portion of the payload using a second codebook of the plurality of codebooks.

Example 2: The method of example 1, wherein each first orthogonal matrix is based at least in part on a product of a third orthogonal matrix and a cyclically shifted matrix, wherein a size of the third orthogonal matrix is based at least in part on the parameter and the number of one or more time periods configured for conveying the payload, and wherein a length of the cyclically shifted matrix is based at least in part on the number of one or more frequency tones configured for conveying the payload.

Example 3: The method of any of examples 1 or 2, further comprising: receiving configuration signaling indicating whether the first portion of the payload and the second portion of the payload are a same set of bits or different subsets of the payload.

Example 4: The method of any of examples 1 to 3, further comprising: receiving configuration signaling indicating a mapping between the first portion of the payload, the second portion of the payload, and the plurality of codebooks.

Example 5: The method of any of examples 1 to 4, further comprising: transmitting the first portion of the payload over a first frequency portion associated with a frequency hopping configuration and the second portion of the payload over a second frequency portion associated with the frequency hopping configuration.

Example 6: The method of any of examples 1 to 5, wherein the first portion of the payload and the second portion of the payload comprise a same set of bits.

Example 7: The method of any of examples 1 to 6, wherein the first portion of the payload comprise a first subset of bits of the payload and the second portion of the payload comprise a second subset of bits of the payload.

Example 8: The method of any of examples 1 to 7, further comprising: receiving configuration signaling indicating an ordering of the first subset of bits and the second subset of bits that is based at least in part on the frequency hopping configuration.

Example 9: The method of any of examples 1 to 8, wherein a size of each first orthogonal matrix of the plurality of orthogonal matrices is based at least in part on a division of the size of the second orthogonal matrix by the parameter.

Example 10: The method of any of examples 1 to 9, wherein each first orthogonal matrix of the plurality of orthogonal matrices comprises a plurality of orthogonal sequences.

Example 11: The method of any of examples 1 to 10, wherein a value of the parameter is based at least in part on a channel quality metric.

Example 12: The method of any of examples 1 to 11, wherein the second orthogonal matrix comprises a plurality of orthogonal sequences that are based at least in part on a product of a third orthogonal matrix having a size corresponding to the number of one or more time periods and a cyclically shifted cell-specific sequence having a length corresponding to the number of one or more frequency tones.

Example 13: The method of any of examples 1 to 12, wherein the third orthogonal matrix comprises a DFT matrix.

Example 14: The method of any of examples 1 to 13, wherein the product comprises a Kronecker product.

Example 15: The method of any of examples 1 to 14, wherein the payload comprises an uplink control information message.

Example 16: An apparatus comprising at least one means for performing a method of any of examples 1 to 15.

Example 17: An apparatus for wireless communications comprising a processor; memory coupled with the processor; and instructions stored in the memory and executable by the processor to cause the apparatus to perform a method of any of examples 1 to 15.

Example 18: A non-transitory computer-readable medium storing code for wireless communications, the code comprising instructions executable by a processor to perform a method of any of examples 1 to 15.

Example 19: A method for wireless communications at a base station, comprising: transmitting configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload; generating a plurality of codebooks corresponding to the plurality of first orthogonal matrices; and receiving a first portion of the payload using a first sequence from a first codebook of the plurality of codebooks and a second portion of the payload using a second codebook of the plurality of codebooks.

Example 20: The method of example 19, wherein each first orthogonal matrix is based at least in part on a product of a third orthogonal matrix and a cyclically shifted matrix, wherein a size of the third orthogonal matrix is based at least in part on the parameter and the number of one or more time periods configured for conveying the payload, and wherein a length of the cyclically shifted matrix is based at least in part on the number of one or more frequency tones configured for conveying the payload.

Example 21: The method of any of examples 19 or 20, further comprising: transmitting configuration signaling indicating whether the first portion of the payload and the second portion of the payload are a same set of bits or different subsets of the payload.

Example 22: The method of any of examples 19 to 21, further comprising: transmitting configuration signaling indicating a mapping between the first portion of the payload, the second portion of the payload, and the plurality of codebooks.

Example 23: The method of any of examples 19 to 22, further comprising: receiving the first portion of the payload over a first frequency portion associated with a frequency hopping configuration and the second portion of the payload over a second frequency portion associated with the frequency hopping configuration.

Example 24: The method of any of examples 19 to 23, wherein the first portion of the payload and the second portion of the payload comprise a same set of bits.

Example 25: The method of any of examples 19 to 24, wherein the first portion of the payload comprise a first subset of bits of the payload and the second portion of the payload comprise a second subset of bits of the payload.

Example 26: The method of any of examples 19 to 25, further comprising: transmitting configuration signaling indicating an ordering of the first subset of bits and the second subset of bits that is based at least in part on the frequency hopping configuration.

Example 27: The method of any of examples 19 to 26, wherein a size of each first orthogonal matrix of the plurality of orthogonal matrices is based at least in part on a division of the size of the second orthogonal matrix by the parameter.

Example 28: The method of any of examples 19 to 27, wherein each first orthogonal matrix of the plurality of orthogonal matrices comprises a plurality of orthogonal sequences.

Example 29: The method of any of examples 19 to 28, wherein a value of the parameter is based at least in part on a channel quality metric.

Example 30: The method of any of examples 19 to 29, wherein the second orthogonal matrix comprises a plurality of orthogonal sequences that are based at least in part on a product of a third orthogonal matrix having a size corresponding to the number of one or more time periods and a cyclically shifted cell-specific sequence having a length corresponding to the number of one or more frequency tones.

Example 31: The method of any of examples 19 to 30, wherein the third orthogonal matrix comprises a DFT matrix.

Example 32: The method of any of examples 19 to 31, wherein the product comprises a Kronecker product.

Example 33: The method of any of examples 19 to 32, wherein the payload comprises an uplink control information message.

Example 34: An apparatus comprising at least one means for performing a method of any of examples 19 to 33.

Example 35: An apparatus for wireless communications comprising a processor; memory coupled with the processor; and instructions stored in the memory and executable by the processor to cause the apparatus to perform a method of any of examples 19 to 33.

Example 36: A non-transitory computer-readable medium storing code for wireless communications, the code comprising instructions executable by a processor to perform a method of any of examples 19 to 33.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload;
    generating a plurality of codebooks corresponding to the plurality of first orthogonal matrices; and
    transmitting a first portion of the payload using a first sequence from a first codebook of the plurality of codebooks and a second portion of the payload using a second codebook of the plurality of codebooks.

2. The method of claim 1, wherein each first orthogonal matrix is based at least in part on a product of a third orthogonal matrix and a cyclically shifted matrix, wherein a size of the third orthogonal matrix is based at least in part on the parameter and the number of one or more time periods configured for conveying the payload, and wherein a length of the cyclically shifted matrix is based at least in part on the number of one or more frequency tones configured for conveying the payload.

3. The method of claim 1, further comprising:
receiving configuration signaling indicating whether the first portion of the payload and the second portion of the payload are a same set of bits or different subsets of the payload.

4. The method of claim 1, further comprising:
receiving configuration signaling indicating a mapping between the first portion of the payload, the second portion of the payload, and the plurality of codebooks.

5. The method of claim 1, further comprising:
transmitting the first portion of the payload over a first frequency portion associated with a frequency hopping configuration and the second portion of the payload over a second frequency portion associated with the frequency hopping configuration.

6. The method of claim 5, wherein the first portion of the payload and the second portion of the payload comprise a same set of bits.

7. The method of claim 5, wherein the first portion of the payload comprise a first subset of bits of the payload and the second portion of the payload comprise a second subset of bits of the payload.

8. The method of claim 7, further comprising:
receiving configuration signaling indicating an ordering of the first subset of bits and the second subset of bits that is based at least in part on the frequency hopping configuration.

9. The method of claim 1, wherein a size of each first orthogonal matrix of the plurality of orthogonal matrices is based at least in part on a division of the size of the second orthogonal matrix by the parameter.

10. The method of claim 1, wherein each first orthogonal matrix of the plurality of orthogonal matrices comprises a plurality of orthogonal sequences.

11. The method of claim 1, wherein a value of the parameter is based at least in part on a channel quality metric.

12. The method of claim 1, wherein the second orthogonal matrix comprises a plurality of orthogonal sequences that are based at least in part on a product of a third orthogonal matrix having a size corresponding to the number of one or more time periods and a cyclically shifted cell-specific sequence having a length corresponding to the number of one or more frequency tones.

13. The method of claim 12, wherein the third orthogonal matrix comprises a discrete Fourier transform (DFT) matrix.

14. The method of claim 12, wherein the product comprises a Kronecker product.

15. The method of claim 1, wherein the payload comprises an uplink control information message.

16. A method for wireless communications at a base station, comprising:
transmitting configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload;
generating a plurality of codebooks corresponding to the plurality of first orthogonal matrices; and
receiving a first portion of the payload using a first sequence from a first codebook of the plurality of codebooks and a second portion of the payload using a second codebook of the plurality of codebooks.

17. The method of claim 16, wherein each first orthogonal matrix is based at least in part on a product of a third orthogonal matrix and a cyclically shifted matrix, wherein a size of the third orthogonal matrix is based at least in part on the parameter and the number of one or more time periods configured for conveying the payload, and wherein a length of the cyclically shifted matrix is based at least in part on the number of one or more frequency tones configured for conveying the payload.

18. The method of claim 16, further comprising:
transmitting configuration signaling indicating whether the first portion of the payload and the second portion of the payload are a same set of bits or different subsets of the payload.

19. The method of claim 16, further comprising:
transmitting configuration signaling indicating a mapping between the first portion of the payload, the second portion of the payload, and the plurality of codebooks.

20. The method of claim 16, further comprising:
receiving the first portion of the payload over a first frequency portion associated with a frequency hopping configuration and the second portion of the payload over a second frequency portion associated with the frequency hopping configuration.

21. The method of claim 20, wherein the first portion of the payload and the second portion of the payload comprise a same set of bits.

22. The method of claim 20, wherein the first portion of the payload comprise a first subset of bits of the payload and the second portion of the payload comprise a second subset of bits of the payload.

23. The method of claim 22, further comprising:
transmitting configuration signaling indicating an ordering of the first subset of bits and the second subset of bits that is based at least in part on the frequency hopping configuration.

24. An apparatus for wireless communications at a user equipment (UE), comprising:
a processor,
memory coupled with the processor; and
instructions stored in the memory and executable by the processor to cause the apparatus to:
receive configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload;
generate a plurality of codebooks corresponding to the plurality of first orthogonal matrices; and
transmit a first portion of the payload using a first sequence from a first codebook of the plurality of codebooks and a second portion of the payload using a second codebook of the plurality of codebooks.

25. The apparatus of claim 24, wherein each first orthogonal matrix is based at least in part on a product of a third orthogonal matrix and a cyclically shifted matrix, wherein a size of the third orthogonal matrix is based at least in part on the parameter and the number of one or more time periods configured for conveying the payload, and wherein a length of the cyclically shifted matrix is based at least in part on the number of one or more frequency tones configured for conveying the payload.

26. The apparatus of claim 24, wherein the instructions are further executable by the processor to cause the apparatus to:
receive configuration signaling indicating whether the first portion of the payload and the second portion of the payload are a same set of bits or different subsets of the payload.

27. The apparatus of claim 24, wherein the instructions are further executable by the processor to cause the apparatus to:
receive configuration signaling indicating a mapping between the first portion of the payload, the second portion of the payload, and the plurality of codebooks.

28. The apparatus of claim 24, wherein the instructions are further executable by the processor to cause the apparatus to:
transmit the first portion of the payload over a first frequency portion associated with a frequency hopping configuration and the second portion of the payload over a second frequency portion associated with the frequency hopping configuration.

29. The apparatus of claim 28, wherein the first portion of the payload and the second portion of the payload comprise a same set of bits.

30. An apparatus for wireless communications at a base station, comprising:
a processor,
memory coupled with the processor; and
instructions stored in the memory and executable by the processor to cause the apparatus to:
transmit configuration signaling indicating a parameter for generating a plurality of first orthogonal matrices, wherein the plurality of first orthogonal matrices are based at least in part on a second orthogonal matrix, and wherein a size of the second orthogonal matrix is based at least in part on a number of one or more time periods configured for conveying a payload and a number of one or more frequency tones configured for conveying the payload;
generate a plurality of codebooks corresponding to the plurality of first orthogonal matrices; and
receive a portion of the payload using a first sequence from a first codebook of the plurality of codebooks and a second portion of the payload using a second codebook of the plurality of codebooks.

* * * * *